US009261227B2

(12) United States Patent
Pierce et al.

(10) Patent No.: US 9,261,227 B2
(45) Date of Patent: Feb. 16, 2016

(54) INTEGRATED BRAKE COMPONENT MOUNTING BRACKET

(71) Applicant: HENDRICKSON USA, L.L.C., Itasca, IL (US)

(72) Inventors: Phillippi R. Pierce, Canton, OH (US); John E. Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 168 days.

(21) Appl. No.: 14/061,823

(22) Filed: Oct. 24, 2013

(65) Prior Publication Data

US 2014/0117176 A1 May 1, 2014

Related U.S. Application Data

(60) Provisional application No. 61/718,777, filed on Oct. 26, 2012.

(51) Int. Cl.
*B60G 11/113* (2006.01)
*F16M 13/02* (2006.01)
*F16D 51/00* (2006.01)

(52) U.S. Cl.
CPC ............. *F16M 13/02* (2013.01); *B60G 11/113* (2013.01); *F16D 51/00* (2013.01); *B60G 2204/121* (2013.01); *F16D 2051/003* (2013.01)

(58) Field of Classification Search
CPC ........... B60G 11/113; B60G 2204/121; B60G 11/10; B60G 11/04; B60G 2202/112; F16D 2051/003
USPC ............. 280/124.17; 74/567; 188/329, 205 R
See application file for complete search history.

(56) References Cited

U.S. PATENT DOCUMENTS

| 2,129,656 | A | * | 9/1938 | Dougherty | ...................... 267/52 |
| 5,366,237 | A | | 11/1994 | Dilling et al. | |
| 6,240,806 | B1 | | 6/2001 | Morris et al. | |
| 6,416,069 | B1 | * | 7/2002 | Ramsey | ................. 280/124.116 |
| 8,454,040 | B2 | | 6/2013 | Westnedge et al. | |
| 2003/0067134 | A1 | * | 4/2003 | Galazin | .................. 280/124.116 |
| 2006/0244234 | A1 | * | 11/2006 | Ramsey | ................. 280/124.131 |
| 2009/0224503 | A1 | | 9/2009 | Richardson | |
| 2010/0253032 | A1 | * | 10/2010 | Ramsey | ................. 280/124.162 |
| 2012/0080573 | A1 | | 4/2012 | Fulton et al. | |
| 2012/0080862 | A1 | * | 4/2012 | Westnedge et al. | ........ 280/124.1 |
| 2013/0154224 | A1 | * | 6/2013 | Wakefield et al. | ...... 280/124.116 |
| 2013/0277936 | A1 | * | 10/2013 | Westnedge et al. | .... 280/124.116 |
| 2015/0014512 | A1 | * | 1/2015 | Pierce et al. | .................. 248/674 |

* cited by examiner

*Primary Examiner* — James English
(74) *Attorney, Agent, or Firm* — Dureska, Kennedy & Moore, L.L.C.; David P. Dureska; Edward T. Kennedy

(57) ABSTRACT

An integrated brake component mounting bracket for a mechanical spring axle/suspension system of a heavy-duty vehicle includes an axle seat that is disposed on and is rigidly connected to an axle of the vehicle. An air chamber mounting bracket is rigidly connected to the axle seat, and a cam shaft assembly mounting bracket is rigidly connected to the axle seat. A brake air chamber of a brake system is attached to the air chamber mounting bracket, and a cam shaft assembly of the brake system is mounted to the cam shaft assembly mounting bracket. The integrated brake component mounting bracket thus provides mounting of the brake air chamber and the cam shaft assembly on the axle seat, which reduces the number of components that are welded to the axle and enables the use of a thinner-wall axle, desirably reducing the weight and cost associated with the axle/suspension system.

19 Claims, 16 Drawing Sheets

INTEGRATED BRAKE COMPONENT MOUNTING BRACKET

CROSS-REFERENCE TO RELATED APPLICATIONS

This application claims the benefit of U.S. Provisional Patent Application Ser. No. 61/718,777, which was filed on Oct. 26, 2012.

BACKGROUND OF THE INVENTION

1. Technical Field

The present invention relates to the art of brake component mounting for vehicles. More particularly, the invention relates to the art of mounting brake components on mechanical spring axle/suspension systems for heavy-duty vehicles, such as tractor-trailers or semi-trailers. Still more particularly, the invention relates to an integrated brake component mounting bracket for a mechanical spring axle/suspension system, which enables the brake chamber and the cam shaft assembly to be mounted on an axle seat, desirably reducing the number of components that are welded to the axle and enabling the use of a thinner-wall axle. The use of a thinner-wall axle desirably reduces the weight and cost associated with the axle/suspension system.

2. Background Art

Heavy-duty vehicles that transport freight, for example, tractor-trailers or semi-trailers and straight trucks, include suspension assemblies that connect the axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience, reference herein will be made to a subframe, with the understanding that such reference is by way of example, and that the present invention applies to heavy-duty vehicle primary frames, movable subframes and non-movable subframes.

In the heavy-duty vehicle art, reference is often made to an axle/suspension system, which typically includes a pair of transversely-spaced suspension assemblies and the axle that the suspension assemblies connect to the vehicle subframe. The axle/suspension system of a heavy-duty vehicle acts to locate or fix the position of the axle and to stabilize the vehicle. More particularly, as the vehicle is traveling over-the-road, its wheels encounter road conditions that impart various forces to the axle on which the wheels are mounted, and in turn, to the suspension assemblies which are connected to and support the axle. These forces consequently act to place or create loads on the axle and the suspension assemblies. In order to minimize the detrimental effect of these forces and resulting loads on the vehicle subframe and other vehicle components as the vehicle is operating, and in turn on any cargo and/or occupants being carried by the vehicle, the axle/suspension system is designed to absorb or dampen at least some of the forces and/or resulting loads.

Two common types of heavy-duty vehicles are known in the art as dry freight vans and refrigerated vans. Dry freight vans include enclosed trailers to keep their freight dry, and are used to transport a wide variety of non-perishable consumer and industrial goods. Refrigerated vans include enclosed trailers with refrigeration systems, and typically are used to transport perishable goods. Such dry freight vans and refrigerated vans have traditionally employed axle/suspension systems that utilize mechanical spring axle/suspension assemblies. These mechanical spring axle/suspension assemblies typically include a pair of leaf spring sets or stacks that are transversely spaced and are connected to the axle. Each leaf spring stack is engineered to carry the rated vertical load of its respective axle. Ordinarily, a trailer of a dry freight or refrigerated van employs two mechanical spring axle/suspension systems at the rear of the trailer, that is, a front axle/suspension system and a rear axle/suspension system, which is a configuration that is collectively referred to in the art as a trailer tandem axle/suspension system. As is known to those skilled in the art, the front end of the trailer is supported by a separate axle/suspension system of the tractor. For the purpose of convenience, reference herein shall be made to a spring axle/suspension system with the understanding that such reference is to a trailer tandem mechanical spring axle/suspension system.

In most axle/suspension systems, it is necessary to mount components of the vehicle braking system to one or more locations on the axle/suspension system. More particularly, the axle of the axle/suspension system includes a central tube, and an axle spindle is integrally connected by any suitable means, such as welding, to each end of the central tube. A wheel end assembly is rotatably mounted, as known in the art, on each axle spindle. A brake drum is mounted on the wheel end assembly, and as will be described in greater detail below, components of the vehicle braking system are actuated to apply friction to the brake drum in order to slow or stop the vehicle. Inasmuch as each end of the axle and its associated spindle, wheel end assembly and brake drum is generally identical to the other, only one axle end and its associated spindle, wheel end assembly and brake drum will be described herein.

As known in the art, when the operator of a heavy-duty vehicle applies the vehicle brakes to slow or stop the vehicle, compressed air is communicated from an air supply source, such as a compressor and/or air tank, through air lines to a brake chamber. The brake chamber converts the air pressure into mechanical force and moves a pushrod. The pushrod in turn moves a slack adjuster, which is connected to one end of a cam shaft of a cam shaft assembly. The cam shaft assembly enables smooth, stable rotation of the cam shaft upon movement of the slack adjuster. An S-cam is mounted on the end of the cam shaft that is opposite the slack adjuster, so that rotation or turning of the cam shaft by the slack adjuster causes rotation of the S-cam. Rotation of the S-cam forces brake linings or pads to make contact with the brake drum to create friction and thus slow or stop the vehicle. In order for the brake chamber, pushrod, slack adjuster, and cam shaft to operate properly, the brake chamber and the cam shaft assembly must be mounted on a generally stable structural member near the brake drum. More particularly, mounting of the brake chamber and the cam shaft assembly on a generally stable structural member near the brake drum is necessary so that proper alignment of the brake chamber, pushrod, slack adjuster, and cam shaft is maintained, which is important for proper actuation and performance of the brake system.

In spring axle/suspension systems of the prior art, the brake chamber has been mounted on a brake chamber bracket, and the cam shaft assembly has been mounted on a cam shaft assembly mounting bracket, which is also referred to in the art as an S-cam bearing bracket. Because it is not feasible to mount the brake chamber bracket and/or the cam shaft assembly mounting bracket directly on or to a leaf spring, these brackets have been mounted on the axle in the prior art. More particularly, the leaf spring must flex to dampen forces and thus does not provide a stable structural mounting surface. In addition, because a leaf spring is formed with a metallurgical structure that enables it to flex while withstanding significant stress, attempting to mount such brackets directly on or to the leaf spring may significantly decrease the ability of the leaf spring to withstand stress. As a result, the axle central tube, which is a generally stable structural member that is relatively near the brake drum, has been used as a mounting location for the brake chamber bracket and the cam shaft assembly mounting bracket.

More particularly, the brake chamber bracket has been rigidly attached by welding to a front portion of the axle central tube just inboardly of a respective leaf spring stack. Similarly, the cam shaft assembly mounting bracket has been rigidly attached by welding to a rear portion of the axle central tube just inboardly of a respective leaf spring stack. Such prior art mounting of the brake chamber to a bracket that is in turn welded to the axle central tube, and mounting of the cam shaft assembly to a bracket that is also in turn welded to the axle central tube, has provided a generally stable structural mounting configuration that enables sufficient operation of the brake system components. However, this configuration has certain disadvantages, including a susceptibility to stress.

For example, axles typically are hollow, which desirably reduces the amount of material used to manufacture an axle, thereby decreasing manufacturing costs, and also reduces axle weight, thereby reducing vehicle fuel consumption and costs associated with operation of the vehicle. As a result, it is desirable to use an axle with the thinnest possible wall to optimize the material and weight savings.

It is known in the art that the portion of the axle central tube which is between the leaf spring stacks is a high-stress area, due to the transmission of forces and the creation of resulting loads across the axle between the leaf spring stacks during vehicle operation. When a component is welded to a hollow axle central tube, an area on the axle wall adjacent the weld is created that is generally more susceptible to stress than a non-welded area. As a result, when forces and resulting loads act upon the axle, a welded area along the axle central tube is generally more susceptible to possible damage from such forces and/or loads than a non-welded area. In order to compensate for the increased susceptibility to stress that is caused by welds, the wall thickness of the axle typically is increased, which undesirably increases the amount of material used to manufacture the axle, and also increases the weight of the axle. Thus, in the prior art, the use of a brake chamber bracket and a cam shaft assembly mounting bracket that are each welded to the axle central tube has required the use of a relatively-thick-walled axle, which undesirably increases the cost and weight of the axle.

Alternatively in the prior art, air-ride axle/suspension systems, which are different in structure and operation from spring axle/suspension systems, have employed mounting structures in which welding of the brake chamber bracket and/or the cam shaft assembly mounting bracket to the axle central tube was eliminated. However, such mounting structures cannot be employed in a spring axle/suspension system because air-ride axle/suspension systems are different in structure and operation from spring axle/suspension systems. For example, air-ride axle/suspension systems include a pair of transversely-spaced leading or trailing arm box-type beams, in which a first end of each box-type beam is connected to the vehicle subframe, and a second or opposite end of each box-type beam is connected to the axle. In the air-ride axle/suspension system prior art, welding of the brake chamber bracket and/or the cam shaft assembly mounting bracket to the axle central tube was eliminated by mounting the brake chamber and the cam shaft assembly mounting bracket directly on the box-type beam.

Due to the different structural requirements and operation of box-type beams of an air-ride axle/suspension system and leaf springs of a spring axle/suspension system, it is not feasible to attach the brake chamber bracket and the bearing bracket directly to a leaf spring. More particularly, air-ride axle/suspension systems include air springs to dampen certain forces and thus cushion the vehicle ride. As a result, each box-type beam typically is a rigid beam that is fabricated or cast and typically includes one or more sidewalls, an upper wall, and a rear wall, and is rigidly connected to the axle. As described above, in order for the brake chamber, pushrod, slack adjuster and cam shaft to operate properly, the brake chamber and the cam shaft assembly must be mounted on a generally stable structural member near the brake drum. In an air-ride axle/suspension system, the generally rigid nature of each box-type beam and its generally rigid connection to the axle enables the box beam to be used as a stable structural mounting surface for components such as the brake chamber or brake chamber bracket and the cam shaft assembly mounting bracket. In addition, since each air-ride axle/suspension system box-type beam includes one or more sidewalls, an upper wall, and a rear wall, sufficient structural surface area is provided to enable components such as the brake chamber or brake chamber bracket and the cam shaft assembly mounting bracket to be attached to the box-type beam.

In contrast, spring axle/suspension systems do not employ air springs, instead relying on the leaf springs to flex and thus dampen forces. Because the leaf springs flex during vehicle operation, they do not provide a sufficient stable structural mounting surface to enable the mounting of components such as the brake chamber or brake chamber bracket and the cam shaft assembly mounting bracket. In addition, because leaf springs are formed with a metallurgical structure that enables them to flex while withstanding significant stress, it is undesirable to attempt to mount such components or brackets on the leaf springs, as such mounting may significantly decrease the ability of the leaf springs to withstand stress.

As a result, a need has existed in the art for a brake component mounting bracket that overcomes the disadvantages of prior art systems by providing a structure that enables a brake chamber and a cam shaft assembly to be rigidly mounted on or adjacent to the axle without welding a brake chamber bracket or a cam shaft assembly mounting bracket to the vehicle axle, thereby enabling a thinner-wall axle to be used, which in turn desirably reduces the weight and cost associated with the axle/suspension system. The integrated brake component mounting bracket for a spring axle/suspension system of the present invention satisfies this need, as will be described below.

BRIEF SUMMARY OF THE INVENTION

An objective of the present invention is to provide a brake component mounting bracket that enables a brake chamber and a cam shaft assembly to be rigidly mounted on or adjacent to the vehicle axle without welding a brake chamber bracket or a cam shaft assembly mounting bracket to the axle.

Another objective of the present invention is to provide a brake component mounting bracket that enables the use of a thinner-wall axle, thereby reducing the weight and cost associated with the axle/suspension system.

This objective and others are obtained by the brake component mounting bracket of the present invention. In an exemplary embodiment of the invention, the brake component mounting bracket for a mechanical spring axle/suspension system of a heavy-duty vehicle includes an axle seat that is rigidly connected to an axle of the vehicle. The brake component mounting bracket also includes an air chamber mounting bracket that is rigidly connected to the axle seat, and a cam shaft assembly mounting bracket that is rigidly connected to the axle seat. A brake air chamber of a brake system is rigidly attached to the air chamber mounting bracket, and a cam shaft assembly of the brake system is rigidly mounted to the cam shaft assembly mounting bracket.

BRIEF DESCRIPTION OF THE SEVERAL VIEWS OF THE DRAWINGS

The preferred embodiments of the present invention, illustrative of the best modes in which Applicant has contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
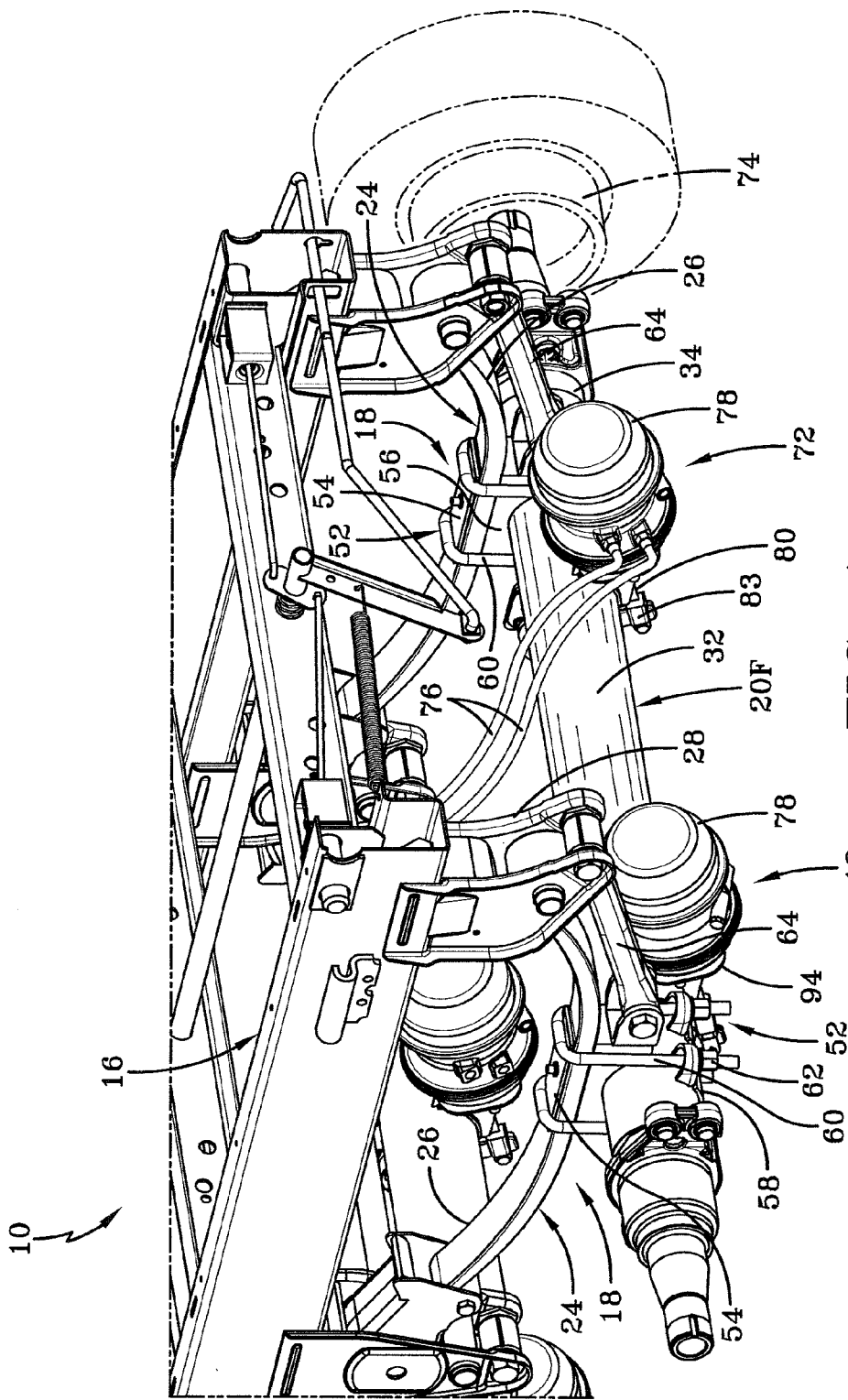
FIG. 1 is a fragmentary passenger side front perspective view of a portion of a prior art trailer tandem mechanical spring axle/suspension assembly, shown mounted on a vehicle, with a driver's side tire and brake drum represented by broken lines.
Figure 2:
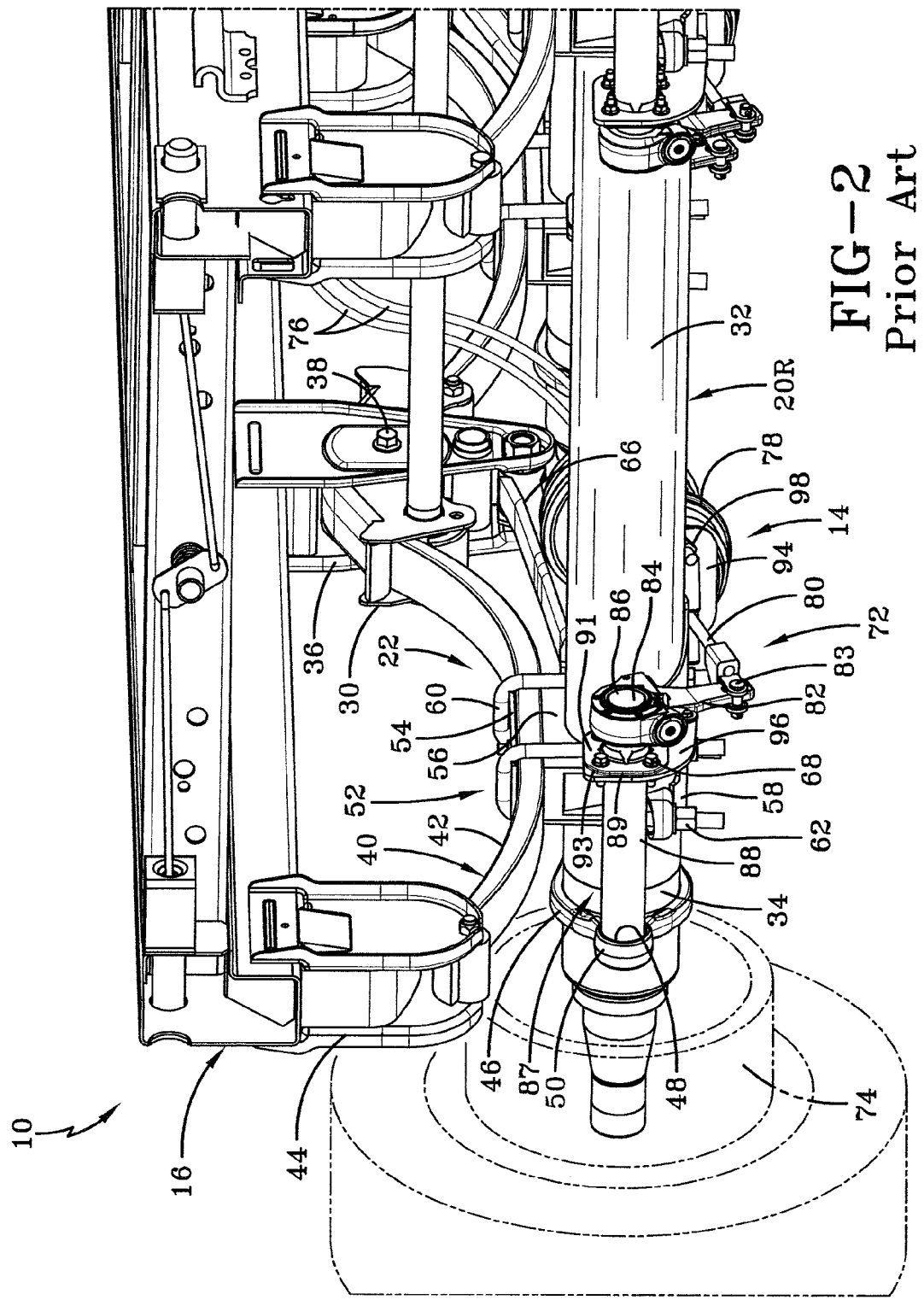
FIG. 2 is a fragmentary passenger side rear perspective view of the prior art trailer tandem mechanical spring axle/suspension assembly shown in FIG. 1, with a driver's side tire and brake drum represented by broken lines.

In order to better understand the integrated brake component mounting bracket of the present invention and the environment in which it operates, a prior art spring axle/suspension system is indicated generally at 10 and is shown in FIGS. 1 and 2. Prior art spring axle/suspension system 10 is a tandem axle/suspension system, utilizing a front axle/suspension system 12 and a rear axle/suspension system 14, each of which is connected to and depends from a vehicle frame or subframe 16, as known in the art. As mentioned above, in some heavy-duty vehicles, the axle/suspension systems are connected directly to the primary frame of the vehicle, while in other heavy-duty vehicles, the primary frame of the vehicle supports a movable or non-movable subframe, and the axle/suspension systems connect directly to the subframe. For the purpose of convenience, reference herein will be made to subframe 16, with the understanding that such reference is by way of example, and that the present invention applies to heavy-duty vehicle primary frames, movable subframes and non-movable subframes.

Front axle/suspension system 12 includes a pair of transversely-spaced, longitudinally-extending mechanical spring suspension assemblies 18, which connect to a front axle 20F. Similarly, rear axle/suspension system 14 includes a pair of transversely-spaced, longitudinally-extending mechanical spring suspension assemblies 22 (only one of which is shown), which connect to a rear axle 20R. Inasmuch as each one of the pair of front mechanical spring suspension assemblies 18 is identical to the other, and each one of the pair of rear mechanical spring suspension assemblies 22 is identical to the other, only one of each will be described herein. Front mechanical spring suspension assembly 18 includes a leaf spring set or stack 24, which in turn includes one or more leaf springs 26. Rear mechanical spring suspension assembly 22 includes a leaf spring set or stack 40, which in turn includes one or more leaf springs 42.

In front mechanical spring suspension assembly 18, front leaf spring 26 extends longitudinally between a front hanger 28, which is mounted on and depends from subframe 16 in a manner known to those skilled in the art, and an equalizer or rocker 30 (FIG. 2). Equalizer 30 in turn is pivotally connected to a center hanger 36 by a pin and bushing assembly 38, and the center hanger is mounted on and depends from subframe 16, as known in the art. In rear mechanical spring suspension assembly 22, rear leaf spring 42 extends longitudinally between equalizer 30 and a rear hanger 44, which is mounted on and depends from subframe 16 in a manner known to those skilled in the art. Also as known in the art, equalizer 30 provides a connection between front and rear suspension assemblies 18, 22, respectively, and pivots in order to attempt to balance the loads between front and rear axles 20F, 20R.

Front leaf spring 26 is clamped to front axle 20F by a clamp assembly 52. More particularly, clamp assembly 52 includes a top block 54 that is disposed on the upper surface of leaf spring 26 at about the longitudinal midpoint of the top spring, a top axle seat 56 that extends between the bottom of the leaf spring and the upper portion of front axle 20F in vertical alignment with the top block, and a bottom axle seat 58, which is a essentially a curved plate disposed on the lower portion of the front axle in vertical alignment with the top block and the top axle seat. Clamp assembly 52 also includes a pair of U-bolts 60, each one of which engages top block 54 and extends through a pair of openings (not shown) formed in bottom axle seat 58. In this manner, top block 54, front leaf spring 26, top axle seat 56, axle 20F, and bottom axle seat 58 are rigidly clamped together when nuts 62 are tightened onto threaded ends of U-bolts 60. It is understood that rear leaf spring 42 is clamped to rear axle 20R by clamp assembly 52 in a manner similar to that as described for front leaf spring 26.

In order to control fore-aft movement of front axle 20F, a front radius rod 64 is pivotally connected to and extends between front hanger 28 and front axle top axle seat 56. Likewise, to control fore-aft movement of rear axle 20R, a rear radius rod 66 is pivotally connected to and extends between center hanger 36 and rear axle top axle seat 56.

Inasmuch as each one of front axle 20F and rear axle 20R is identical to the other, only one axle will be described herein. Axle 20F includes a central tube 32, and an axle spindle 34 is integrally connected by any suitable means, such as welding, to each end of the central tube. A wheel end assembly (not shown) is rotatably mounted on each axle spindle 34, as known in the art. A brake system 72 includes a brake drum 74 that is mounted on the wheel end assembly. Inasmuch as each end of axle 20F and its associated spindle 32, the wheel end assembly, brake drum 74, and associated components of brake system 72 are generally identical to the other, only one end of the axle and its associated spindle, wheel end assembly, brake drum, and associated components of the brake system will be described herein.

In order to slow or stop the vehicle, compressed air is communicated through air lines 76 to a brake air chamber or brake chamber 78, which converts the air pressure into mechanical force and moves a pushrod 80 in a longitudinal manner relative to the brake chamber. Pushrod 80 is pivotally connected to slack adjuster 82 by a pin-and-link assembly or clevis 83, which enables the slack adjuster to convert the longitudinal movement of the pushrod to rotational movement. Slack adjuster 82 in turn is connected to an inboard end 84 of a cam shaft 86 of a cam shaft assembly 87. As known in the art, cam shaft inboard end 84 is splined and meshingly engages a corresponding splined interior surface (not shown) of slack adjuster 82. An S-cam 90 (FIG. 3) of cam shaft assembly 87 is mounted on an outboard end 92 of cam shaft 86, whereby rotation of the cam shaft by slack adjuster 82 causes rotation of the S-cam. Rotation of S-cam 90 forces brake linings or pads 154 (FIG. 5) to make contact with an inner surface of brake drum 74 to create friction and thus slow or stop the vehicle.

Figure 5:
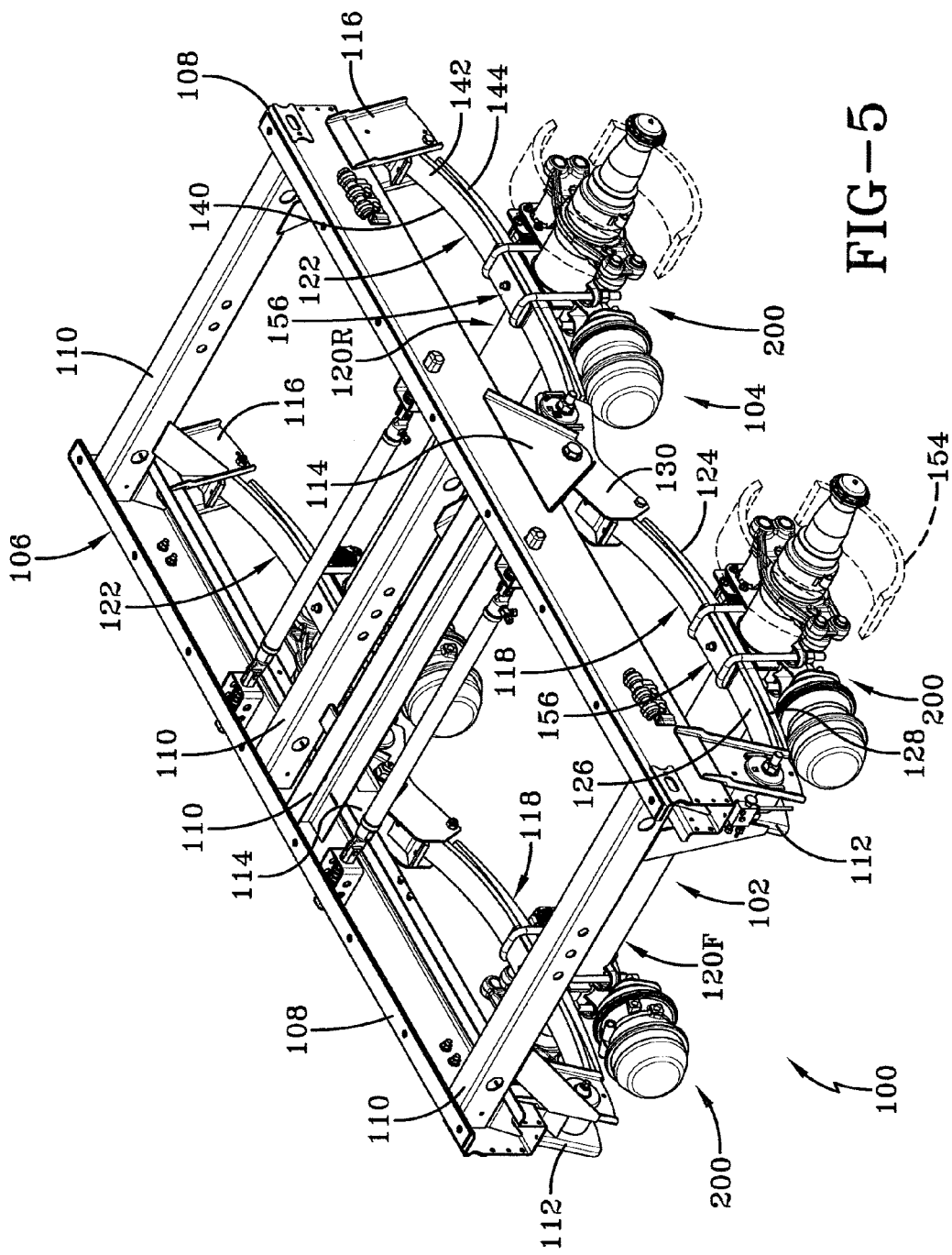
FIG. 5 is a driver's side top-front perspective view of a trailer tandem mechanical spring axle/suspension system including a first exemplary embodiment of the integrated brake component mounting bracket of the present invention, shown mounted on a vehicle subframe and with brake system components mounted thereon, with driver's-side brake pads represented by broken lines.

Components of cam shaft assembly 87 enable smooth, stable rotation of cam shaft 86 upon movement of slack adjuster 82. More particularly, cam shaft 86 is rotatably mounted in a cam tube 88 by bushings (not shown), as known in the art, and extends through the tube. In this manner, inboard end 84 of cam shaft 86 is exposed in order to engage slack adjuster 82, and outboard end 92 (FIG. 3) of the cam shaft is also exposed in order to enable S-cam 90 to engage brake linings or pads 154 (FIG. 5). In order to secure the position of cam shaft 86 parallel to axle 20F, and to ensure that only the cam shaft rotates, rather than cam tube 88, a cam tube bracket 89 receives and retains the inboard end of the cam tube. An exemplary cam tube bracket 89 includes an inboard plate 91 and an outboard plate 93, each one of which is formed with a plurality of tabs 152 (FIG. 7) that secure the cam tube, as more fully described in U.S. Pat. No. 7,537,224, which is assigned to the same assignee as the present invention, Hendrickson USA, L.L.C. To support the outboard end of cam tube 88 and thus outboard end 92 of cam shaft 86, a brake spider 46 is immovably mounted on axle 20F, such as by welding, outboardly of spring stack 24. The outboard end of cam tube 88 is mounted in a bore 48 formed in a collar 50 of spider 46, as known in the art.

Alignment of brake chamber 78, pushrod 80, slack adjuster 82, and cam shaft 86 is important for proper actuation and performance of brake system 72, thereby necessitating the mounting of the brake chamber and cam shaft assembly 87 on a stable structural member near brake drum 74. In the prior art, such mounting was achieved by mounting brake chamber 78 on a brake chamber mounting bracket 94, and by mounting cam tube bracket 89 of cam tube assembly 87 on a cam shaft assembly mounting bracket 96, which is also referred to in the art as an S-cam bearing bracket.

More particularly, brake chamber 78 is mounted on brake chamber mounting bracket 94 by mechanical fasteners, such as bolts 98. Brake chamber mounting bracket 94 in turn is rigidly attached to axle 20F by welding the bracket to a front portion of axle central tube 32 inboardly of leaf spring 26. Similarly, cam tube bracket 89 is mounted on cam shaft assembly mounting bracket 96 by mechanical fasteners, such as bolts 68. Cam shaft assembly mounting bracket 96 in turn is rigidly attached to axle 20F by welding the bracket to a rear portion of axle central tube 32 inboardly of leaf spring 26.

When a component such as brake chamber mounting bracket 94 and/or cam shaft assembly mounting bracket 96 is welded to axle central tube 32, an area on the wall of axle 20F adjacent the weld is created that is generally more susceptible to stress than a non-welded area. Because the portion of axle central tube 32 that is between leaf springs 26 is known to be a high-stress area due to the transmission of forces and resulting loads across axle 20F during vehicle operation, the welded area of the axle central tube is generally more susceptible to possible damage from such forces and/or loads than a non-welded area. In order to compensate for the increased susceptibility to stress that is caused by welding brake chamber mounting bracket 94 and cam shaft assembly mounting bracket 96 to axle 20F, the wall thickness of the axle typically is increased. Such an increase in wall thickness undesirably increases the amount of material used to manufacture axle 20F, undesirably increasing the weight of the axle, in turn undesirably increasing manufacturing costs and fuel consumption.

Figure 3:
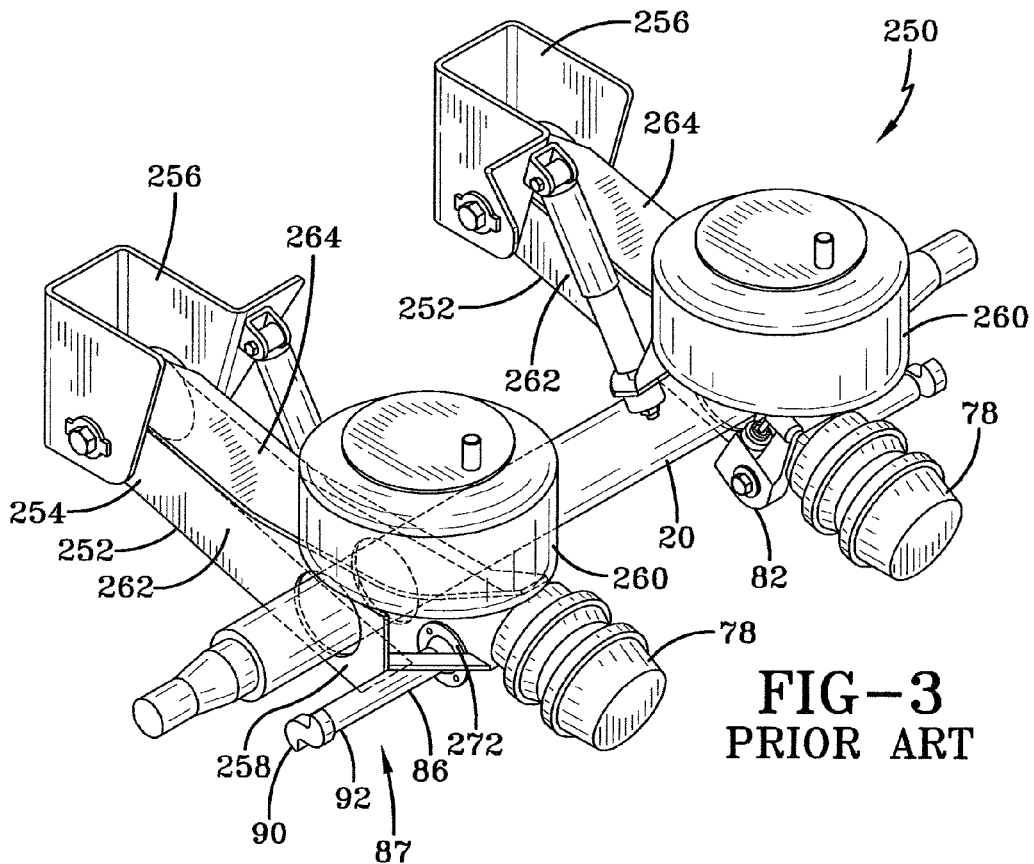
FIG. 3 is a top rear perspective view of a prior art air-ride axle/suspension system, with hidden components represented by broken lines.
Figure 4:
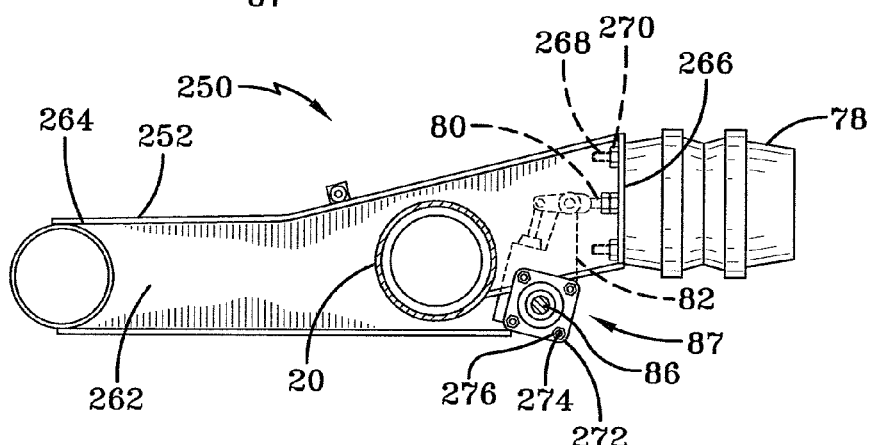
FIG. 4 is a side elevational view of selected components of the prior art air-ride axle/suspension system shown in FIG. 3, partially in section, with a box-type beam and brake system components represented by broken lines.

Alternatively in the prior art, air-ride axle/suspension systems, such as an exemplary air-ride axle/suspension system indicated generally at 250 and shown in FIGS. 3 and 4, have employed structures in which welding of the brake chamber bracket and/or the bearing bracket to the axle central tube was eliminated, which was enabled by the structural differences between air-ride axle/suspension systems and spring axle/suspension systems 10. More particularly, and as described in greater detail in U.S. Pat. No. 5,366,237, air-ride axle/suspension system 250 includes a pair of transversely-spaced leading or trailing arm box-type beams 252. A first end 254 of each box-type beam 252 is pivotally connected to a hanger 256, which in turn is rigidly connected to the vehicle subframe 16 (FIG. 1), and a second end 258 of each box-type beam is rigidly connected to axle 20. Air-ride axle/suspension system 250 includes air springs 260 to cushion the vehicle ride and provide some damping characteristics, enabling each box-type beam 252 to be a rigid beam that is fabricated or cast, and which includes one or more sidewalls 262, an upper wall 264, and a rear wall 266.

In air-ride axle/suspension system 250, brake chamber 78 is mounted directly on box-type beam rear wall 266 by brake chamber bolts 268 and nuts 270. A cam shaft assembly mounting bracket 272 is connected to a selected one of beam sidewalls 262 by bolts 274 and nuts 276, and supports cam shaft assembly 87, which is mounted on the bracket. With this structure, brake chamber 78 moves pushrod 80 upon actuation. Pushrod 80 in turn moves slack adjuster 82, as enabled by the pivotal connection of the pushrod to the slack adjuster. Slack adjuster 82 is operatively connected to cam shaft 86 of cam shaft assembly 87, enabling rotation of the cam shaft upon movement of the slack adjuster. Rotation of cam shaft 86 by slack adjuster 82 causes rotation of S-cam 90, which is mounted on outboard end 92 of the cam shaft. Rotation of S-cam 90 forces brake linings or pads 154 (FIG. 5) to make contact with an inner surface of brake drum 74 (FIG. 1) to create friction and thus slow or stop the vehicle. It is understood that, while cam shaft assembly 87 is shown in FIGS. 3 and 4 without cam tube 88, the cam shaft assembly may employ the cam tube and its associated components, in a manner similar to that as described above.

Alignment of brake chamber 78, pushrod 80, slack adjuster 82, and cam shaft 86 is important for proper actuation and performance of brake system 72, thereby necessitating the mounting of the brake chamber and cam shaft assembly 87 on a stable structural member near brake drum 74. In air-ride axle/suspension system 250, the rigid nature of each box-type beam 252 and its rigid connection to axle 20 enables the box beam to be used as a stable structural mounting surface for brake chamber 78 and cam shaft assembly mounting bracket 272. In addition, since each air-ride axle/suspension system box-type beam 252 includes sidewalls 262, upper wall 264, and rear wall 266, sufficient structural surface area is provided to enable the mounting of brake chamber 78 and cam shaft assembly mounting bracket 272 to the box-type beam.

In contrast, as shown in FIGS. 1 and 2, spring axle/suspension system 10 does not employ air springs 260 (FIG. 3), instead relying on leaf springs 26, 42 to flex and thus dampen forces. Because leaf springs 26, 42 flex during vehicle operation, they do not provide a sufficient stable structural mounting surface to enable the mounting of brake chamber 78, brake chamber bracket 94, and/or cam shaft assembly mounting bracket 96, 272. In addition, because leaf springs 26, 42 are formed with a metallurgical structure that enables them to flex while withstanding significant stress, it is undesirable to attempt to mount brake chamber 78, brake chamber bracket 94, and/or cam shaft assembly mounting bracket 96, 272 on the leaf springs, as such mounting may significantly decrease the ability of the leaf springs to withstand stress.

Therefore, there is a need in the art for a brake component mounting bracket that overcomes the disadvantages of prior art systems by providing a structure that enables a brake chamber and a cam shaft assembly to be rigidly mounted in conjunction with a spring axle/suspension system without welding a brake chamber bracket or a cam shaft assembly mounting bracket to the vehicle axle, thereby enabling a thinner-wall axle to be used. The integrated brake component mounting bracket for a spring axle/suspension system of the present invention satisfies this need, as will now be described.

Turning to the drawings of the present invention, wherein the illustrations are for showing the preferred embodiment of the invention, and not for limiting the same, FIGS. 5-8 show a first exemplary embodiment of an integrated brake component mounting bracket of the present invention, indicated generally at 200, for a spring axle/suspension system. In order to better understand integrated brake component mounting bracket 200 and the environment in which it operates, an exemplary spring axle/suspension system incorporating the integrated mounting bracket is indicated generally at 100, and is more fully described in U.S. Provisional Patent Application Ser. No. 61/718,767, filed on Oct. 26, 2012, by the same assignee, Hendrickson USA, L.L.C.

Referring now to FIG. 5, spring axle/suspension system 100 is a tandem system, utilizing a front axle/suspension system 102 and a rear axle/suspension system 104, each of which is connected to and depends from a vehicle subframe 106. It is to be understood that in some heavy-duty vehicles, the axle/suspension systems are connected directly to the primary frame of the vehicle, while in other heavy-duty vehicles, the primary frame of the vehicle supports a movable or non-movable subframe, and the axle/suspension systems connect directly to the subframe. For the purpose of convenience, reference herein will be made to subframe 106, with the understanding that such reference is by way of example, and that the present invention applies to heavy-duty vehicle primary frames, movable subframes and non-movable subframes.

Subframe 106 includes a pair of longitudinally-extending, parallel, transversely-spaced elongated main members 108. A plurality of longitudinally-spaced parallel cross members 110 extend transversely between and are attached to main members 108. Pairs of transversely spaced hangers, including front hangers 112, center hangers 114, and rear hangers 116, are mounted on and depend from main members 108 and selected ones of cross members 110. It should be noted that, while hangers 112, 114, 116 are sometimes considered to be part of subframe 106 once they are connected to main members 108 and selected ones of cross members 110, they are typically engineered as part of spring axle/suspension system 100.

Front axle/suspension system 102 includes a pair of transversely-spaced, longitudinally-extending mechanical spring suspension assemblies 118, which connect to a front axle 120F. Similarly, rear axle/suspension system 104 includes a pair of transversely-spaced, longitudinally-extending mechanical spring suspension assemblies 122, which connect to a rear axle 120R. Inasmuch as each one of the pair of front mechanical spring suspension assemblies 118 is identical to the other, and each one of the pair of rear mechanical spring suspension assemblies 122 is identical to the other, only one of each will be described herein. Front mechanical spring suspension assembly 118 includes a pair of transversely-spaced leaf spring sets or stacks 124, and rear mechanical spring suspension assembly 122 includes a pair of transversely-spaced leaf spring sets or stacks 140.

Front spring stack 124 preferably includes a top leaf spring 126 and a bottom leaf spring 128. Top leaf spring 126 extends longitudinally between front hanger 112 and an equalizer or rocker 130. Rear spring stack 140 preferably includes a top leaf spring 142 and a bottom leaf spring 144, and extends longitudinally between equalizer 130 and rear hanger 116. As known in the art, equalizer 130 provides a connection between front and rear suspension assemblies 118, 122, respectively, and is able to pivot in order to help balance the loads between front and rear axles 120F, 120R.

Each spring stack 124, 140 is clamped to its respective axle 120F, 120R by a clamp assembly 156. More particularly, and with reference now to FIGS. 6 and 7, clamp assembly 156 includes an upper plate 158, a top axle seat 160, integrated brake component mounting bracket 200, and a pair of U-bolts 164. Upper plate 158 is disposed on an upper surface of each top leaf spring 126, 142 at about the longitudinal midpoint of each respective spring. Top axle seat 160 is disposed between a bottom surface of each bottom leaf spring 128, 144 and the upper portion of each respective axle 120F, 120R in general vertical alignment with upper plate 158. In association with first embodiment integrated brake component mounting bracket 200, top axle seat 160 preferably is welded to each respective axle 120F, 120R. Integrated brake component mounting bracket 200, which will be described in greater detail below, is disposed on a lower portion of each axle 120F, 120R in general vertical alignment with upper plate 158 and top axle seat 160, and in the first embodiment of the invention, preferably is welded to each respective axle.

A curved apex 166 of each U-bolt 164 engages and secures upper plate 158, while each threaded end 168 of each U-bolt passes through an opening 172 formed in a respective boss 170, which in turn is formed on integrated brake component mounting bracket 200. In this manner, upper plate 158, top leaf spring 126, 142, bottom leaf spring 128, 144, top axle seat 160, axle 120F, 120R, and integrated brake component mounting bracket 200 are rigidly clamped and secured together when nuts 174 are tightened onto threaded U-bolt ends 168. Preferably, a center bolt 180 extends through each respective upper plate 158, top leaf spring 126, 142, bottom leaf spring 128, 144 and top axle seat 160 to provide an additional interconnection of the springs and clamp assembly 156.

Figure 6:
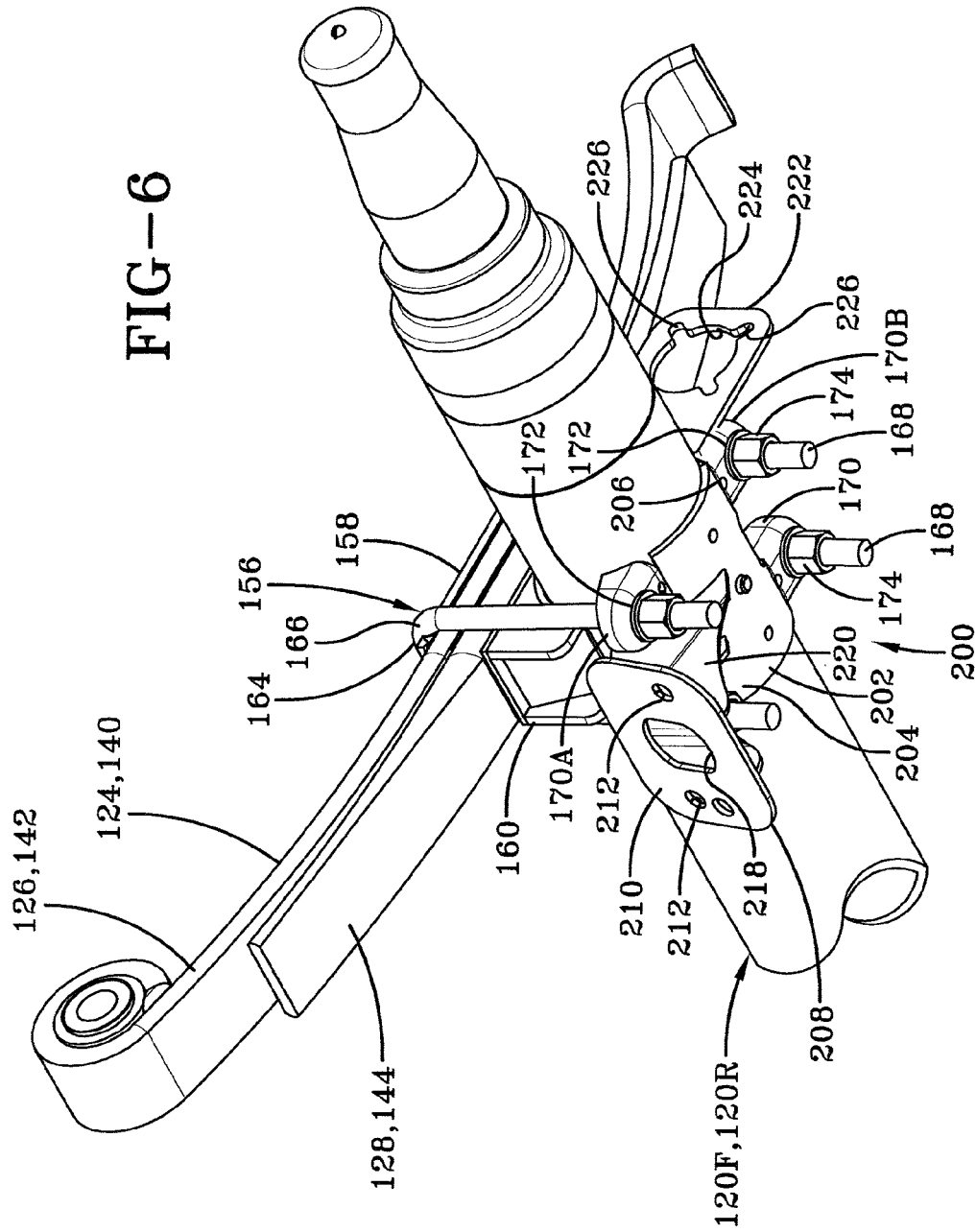
FIG. 6 is an enlarged fragmentary driver's side bottom perspective view of a leaf spring stack, axle, and clamp assembly of one of the spring axle/suspension systems shown in FIG. 5, including the integrated brake component mounting bracket of the present invention, without associated brake components mounted thereon.

With particular reference now to FIG. 6, integrated brake component mounting bracket 200 includes a bottom axle seat 202, an air chamber mounting bracket 208, and a cam shaft assembly mounting bracket 222, which is also referred to as an S-cam bearing bracket. More particularly, bottom axle seat 202 is a curved plate that seats against a lower portion of each axle 120F, 120R and preferably is welded to each respective axle in the first embodiment of the invention. Bottom axle seat includes a front portion 204 and a rear portion 206, and bosses 170 are integrally formed on the seat to receive U-bolts 164, as described above.

Figure 8:
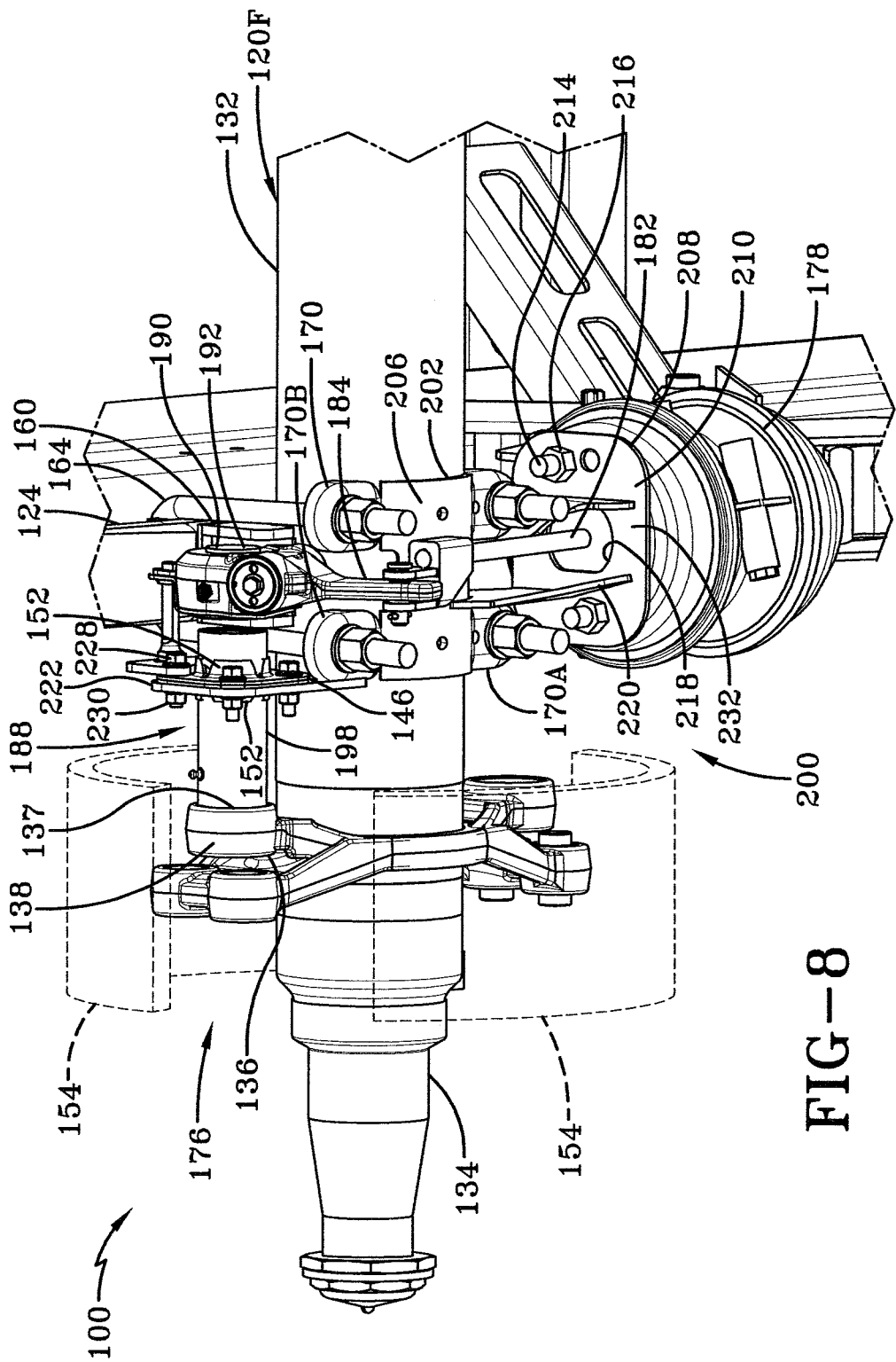
FIG. 8 is an enlarged fragmentary bottom rear view of a rear portion of a driver's side of the trailer tandem mechanical spring axle/suspension assembly shown in FIG. 5, including the integrated brake component mounting bracket of the present invention, with brake pads represented by broken lines.

With additional reference to FIG. 8, air chamber mounting bracket 208 of integrated brake component mounting bracket 200 is rigidly attached to front portion 204 of bottom axle seat 202. More particularly, air chamber mounting bracket 208 includes a mounting plate 210 that is disposed generally parallel to each respective transversely-extending axle 120F, 120R. Mounting plate 210 is formed with openings 212 to accept bolts 214 of a brake chamber 178, which are secured to the mounting plate with nuts 216. A central opening 218 is also formed in mounting plate 210 to enable a brake chamber pushrod 182 to extend through air chamber mounting bracket 208 and connect to a slack adjuster 184. Outboardly of central opening 218, a connecting plate 220 is rigidly attached to a rear surface 232 of mounting plate 210, preferably by welding or integral forming, and extends perpendicular to axle 120F, 120R to front portion 204 of bottom axle seat 202. Connecting plate 220 is rigidly attached, preferably by welding or integral forming, to front portion 204 of bottom axle seat 202 inboardly of an outboard front one 170A of bosses 170. In this manner, connecting plate 220 enables the rigid attachment of mounting plate 210 in alignment with, rather than being inboardly offset from, bottom axle seat 202, thereby providing desired stability of air chamber mounting bracket 208.

With continuing reference to FIGS. 6 and 8, cam shaft assembly mounting bracket 222 of integrated brake component mounting bracket 200 is rigidly attached to rear portion 206 of bottom axle seat 202. Cam shaft assembly mounting bracket 222 extends perpendicular to axle 120F, 120R and is rigidly attached to rear portion 206 of bottom axle seat, preferably by welding or integral forming, outboardly of an outboard rear one 170B of bosses 170. Cam shaft assembly mounting bracket 222 is formed with an opening 224 to enable a cam tube 198 of a cam shaft assembly 188 to extend through the bearing bracket, as will be described in greater detail below. Cam shaft assembly mounting bracket 222 is also formed with a plurality of slots 226 adjacent opening 224 to accept fasteners, such as bolts 228, which are secured with nuts 230, to enable the mounting of a cam tube bracket 146 on the cam shaft assembly mounting bracket, as also will be described in greater detail below. In this manner, cam shaft assembly mounting bracket 222 enables the rigid attachment of cam shaft assembly 188 to bottom axle seat 202, thereby providing desired stability of the cam shaft assembly.

Figure 7:
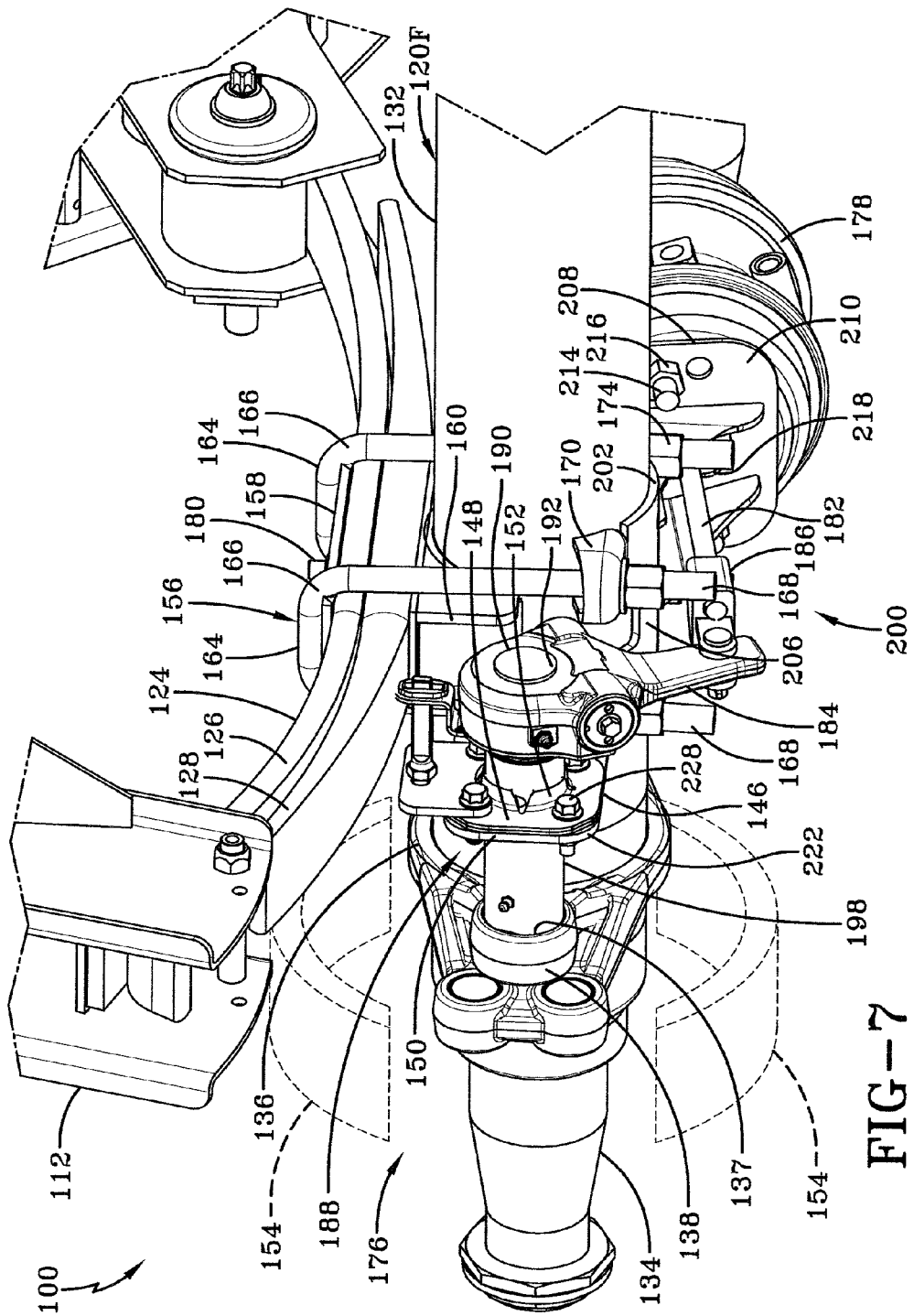
FIG. 7 is an enlarged fragmentary rear perspective view, looking in the outboard direction, of a rear portion of a driver's side of the trailer tandem mechanical spring axle/suspension assembly shown in FIG. 5, including the integrated brake component mounting bracket of the present invention, with brake pads represented by broken lines.

Turning now to FIGS. 7-8, components of a brake system 176 are shown installed on integrated brake component mounting bracket 200. Inasmuch as each one of front axle 120F and rear axle 120R (FIG. 5) is identical to the other, only one axle will be described herein. Axle 120F includes a central tube 132, and an axle spindle 134 is integrally connected by any suitable means, such as welding, to each end of the central tube. A wheel end assembly (not shown) is rotatably mounted on each axle spindle 134, as known in the art. Brake system 176 includes a brake drum 74 (FIG. 1) that is mounted on the wheel end assembly. Inasmuch as each end of axle 120F and its associated spindle 132, the wheel end assembly, brake drum 74, and associated components of brake system 176 are generally identical to the other, only one end of the axle and its associated spindle, wheel end assembly, brake drum, and associated components of brake system will be described herein.

In order to slow or stop the vehicle, compressed air is communicated through air lines 76 (FIG. 1) to brake chamber 178, which is securely mounted on the front of integrated brake component mounting bracket 200. More particularly, bolts 214 of brake chamber 178 extend through openings 212 (FIG. 6) formed in mounting plate 210 of air chamber mounting bracket 208, and are secured to the mounting plate with nuts 216. Pushrod 182 extends rearwardly from brake chamber 178 through central opening 218 formed in mounting plate 210, and extends below bottom axle seat 202 of integrated brake component mounting bracket 200. Pushrod 182 pivotally connects to slack adjuster 184 by an offset pin-and-link assembly or clevis 186, which will be described in greater detail below, and enables the slack adjuster to convert the longitudinal movement of pushrod 182 to rotational movement.

Slack adjuster 184 in turn is connected to an inboard end 192 of a cam shaft 190 of cam shaft assembly 188. As known in the art, cam shaft inboard end 192 preferably is splined and meshingly engages a corresponding splined interior surface (not shown) of slack adjuster 184. Components of cam shaft assembly 188 enable smooth, stable rotation of cam shaft 190 upon movement of slack adjuster 184. More particularly, cam shaft 190 is rotatably mounted in a cam tube 198 by bushings (not shown), as known in the art, and extends through the tube. In this manner, inboard end 192 of a cam shaft 190 is exposed in order to engage slack adjuster 184, and an outboard end of the cam shaft is also exposed in order to enable S-cam 90 (FIG. 3), which is mounted on the outboard end of the cam shaft, to engage brake linings or pads 154. As a result, rotation of cam shaft 190 by slack adjuster 184 causes rotation of S-cam 90 to force brake linings or pads 154 to make contact with an inner surface of brake drum 74 (FIG. 1) to create friction and thus slow or stop the vehicle.

To ensure that only cam shaft 190 rotates, rather than cam tube 198, cam tube bracket 146 receives and retains the inboard end of the cam tube. An exemplary cam tube bracket 146 includes an inboard plate 148 and an outboard plate 150, each one of which is formed with a plurality of tabs 152 that secure the cam tube, as more fully described in U.S. Pat. No. 7,537,224, which is assigned to the same assignee as the present invention, Hendrickson USA, L.L.C. To support the outboard end of cam tube 198 and thus the outboard end of cam shaft 190, a brake spider 136 is immovably mounted on axle 120F, such as by welding, outboardly of spring stack 124. The outboard end of cam tube 198 is mounted in a bore 137 formed in a collar 138 of the spider, as known in the art.

Secure and stable mounting of cam shaft assembly 188 is provided by cam shaft assembly mounting bracket 222 of integrated brake component mounting bracket 200. More particularly, cam shaft assembly mounting bracket 222 is rigidly attached to rear portion 206 of bottom axle seat 202, as described above, and extends rearwardly from axle 120F. Cam tube 198 and cam shaft 190 extend through opening 224 (FIG. 6), as do tabs 152 of outboard plate 150 of cam tube bracket 146. In this manner, cam shaft assembly mounting bracket 222 enables cam tube bracket 146 to prevent rotation of cam tube 198, while providing a secure mounting location for the cam tube bracket. Such mounting is provided by slots 226 formed in cam shaft assembly mounting bracket 222, which align with openings (not shown) formed in inboard plate 148 and outboard plate 150 of cam tube bracket 146. Fasteners, such as bolts 228, pass through each one of respective aligned openings in cam tube bracket 146 and slots 226, thereby enabling the cam tube bracket to be secured to cam shaft assembly mounting bracket 222 when nuts 230 are tightened.

As a result of the structural integration of cam shaft assembly mounting bracket 222 to rear portion 206 of bottom axle seat 202, integrated brake component mounting bracket 200 provides rigid attachment of cam shaft assembly 188 to bottom axle seat 202, thereby providing desired stability and positioning of the cam shaft assembly. Likewise, as a result of the structural integration of air chamber mounting bracket 208 to front portion 204 of bottom axle seat 202, integrated brake component mounting bracket 200 provides rigid attachment of brake chamber 178 to bottom axle seat 202, thereby providing desired stability and positioning of the brake chamber.

In this manner, integrated brake component mounting bracket 200 provides a structure that enables brake chamber 178 and cam shaft assembly 188 to be rigidly mounted on or adjacent each axle 120F, 120R, without welding a brake chamber bracket and/or a cam shaft assembly mounting bracket to the vehicle axle. As described above, prior art brake chamber mounting bracket 94 and cam shaft assembly mounting bracket 96 (FIG. 1) were welded to axle central tube 32 between leaf spring stacks 26, 40. This is a high-stress area due to the transmission of forces and the creation of resulting loads across each axle 20F, 20R during vehicle operation. As a result, when a component is welded to hollow axle central tube 32, an area on the axle wall adjacent the weld is created that is generally more susceptible to stress than a non-welded area, and when forces and resulting loads act upon axle 20F, 20R, the welded area is generally more susceptible to possible damage than a non-welded area. As a result, by eliminating the welding of brackets to each axle 120F, 120R, integrated brake component mounting bracket 200 enables each axle to be less susceptible to possible damage.

In addition, to compensate for the increased susceptibility to stress that was caused by welds, prior art axles 20F, 20R were formed with an increased wall thickness. Because integrated brake component mounting bracket 200 enables elimination of the welding of a brake chamber bracket and/or a cam shaft assembly mounting bracket to each axle 120F, 120R, each axle can be formed with a thinner wall. For example, prior art axle 20F, 20R typically includes a wall thickness of about one-half of an inch (0.500 inches) with a five-inch (5.0 inch) diameter, while each axle 120F, 120R used in conjunction with integrated brake component mounting bracket 200 preferably includes a wall thickness of about 0.312 inches with a five and three-quarter inch (5.75 inch) diameter. Such reduction of the wall thickness of each axle 120F, 120R in turn desirably reduces the cost associated with manufacturing axle/suspension system 100 employing integrated brake component mounting bracket 200, as the amount of material used to manufacture each axle is reduced. Moreover, the reduction of the wall thickness of each axle 120F, 120R desirably reduces the cost to operate a vehicle that employs axle/suspension system 100 with integrated brake component mounting bracket 200, as axle weight is reduced, which in turn reduces vehicle fuel consumption and the resulting costs associated with operation of the vehicle.

It is to be understood that installation of components of brake system 176 on integrated brake component mounting bracket 200 is enabled by adjustment of the geometry of certain brake components. More particularly, prior art cam shaft 86, pin and link assembly or clevis 83, and pushrod 80 (FIGS. 1 and 2) cannot be employed on integrated brake component mounting bracket 200, as these prior art components do not provide sufficient clearance for component installation on the integrated brake component mounting bracket. Moving brake chamber 78 and components of cam shaft assembly 87 from a location between leaf spring stacks 26, 40, respectively, to a location beneath each respective spring stack 124, 140 (FIG. 6) increases the difficulty of assembling components due to the reduced clearances that exist beneath the spring stacks.

With reference to FIGS. 7 and 8, assembly of components on integrated brake component mounting bracket 200 is enabled by cam shaft 190, which is shorter in length than prior art cam shaft 86 (FIG. 2). A shorter length of cam shaft 190 enables slack adjuster 184 to be disposed between rear bosses 170 on bottom axle seat 202. In addition, pin and link assembly or clevis 186 is an offset configuration, as compared to the in-line configuration of prior art pin and link assembly or clevis 83. The offset configuration of clevis 186 allows pushrod 182 to be aligned inboardly of slack adjuster 184, which provides a clearance between the pushrod, the clevis, the slack adjustor and the vehicle tires, and also provides sufficient clearance to install nuts 174 onto U-bolts 164 to secure clamp assembly 156. Moreover, pushrod 182 is longer than prior art pushrod 80, which provides clearance to install nuts 174 onto U-bolts 164 to secure clamp assembly 156, and to install nuts 216 on bolts 214 to secure brake chamber 178 to air chamber mounting plate 210. As a result, integrated brake component mounting bracket 200 cooperates with the specific geometry of components such as cam shaft 190, pin and link assembly or clevis 186, and pushrod 182, to provide secure mounting and optimum positioning of brake chamber 178 and cam shaft assembly 188.

Figure 9:
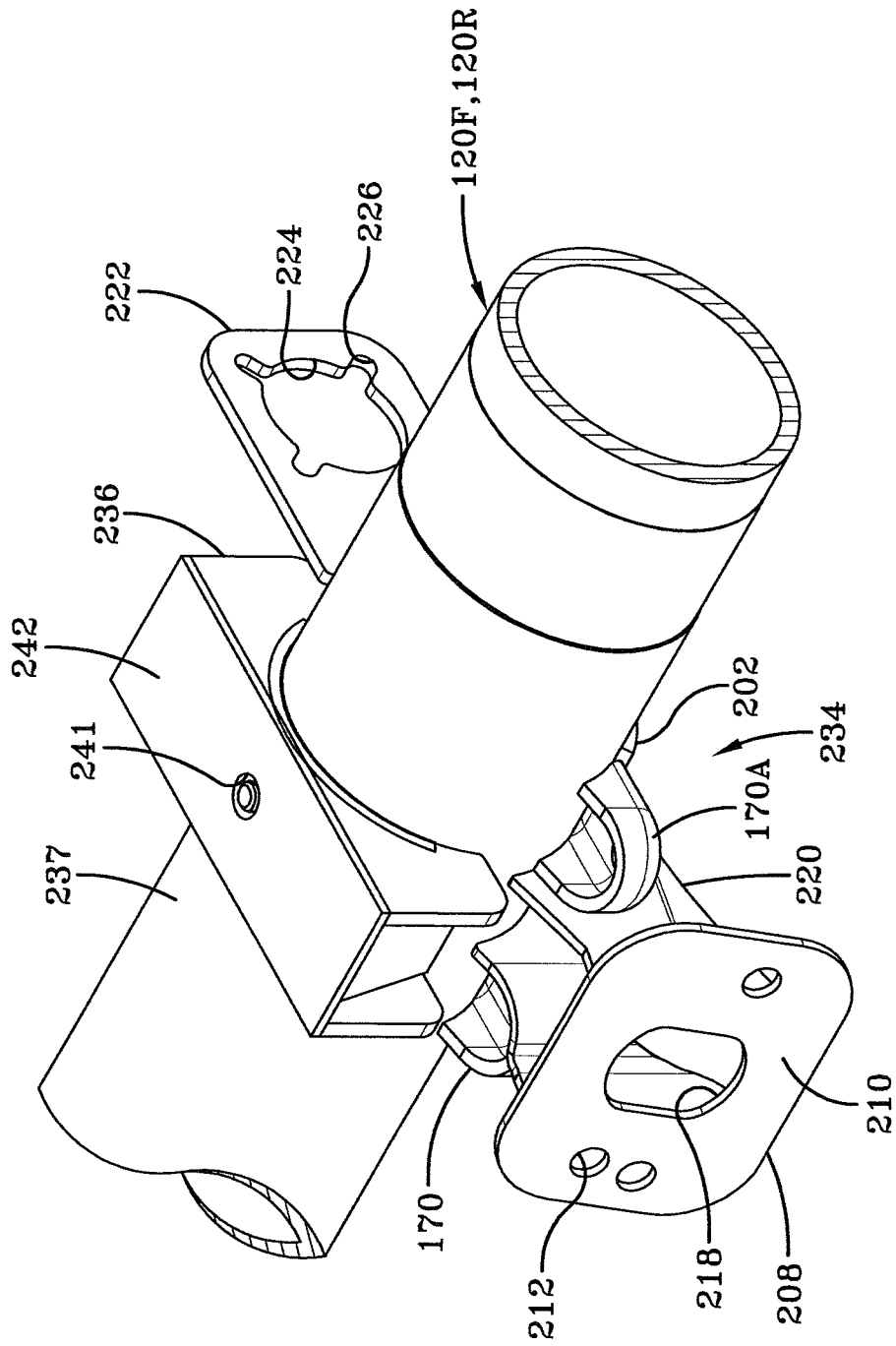
FIG. 9 is a fragmentary driver's side top-front perspective view of a portion of an axle of a trailer tandem mechanical spring axle/suspension assembly, including a top axle seat and a second exemplary embodiment of the integrated brake component mounting bracket of the present invention mounted thereto, without associated brake components mounted thereon.
Figure 10:
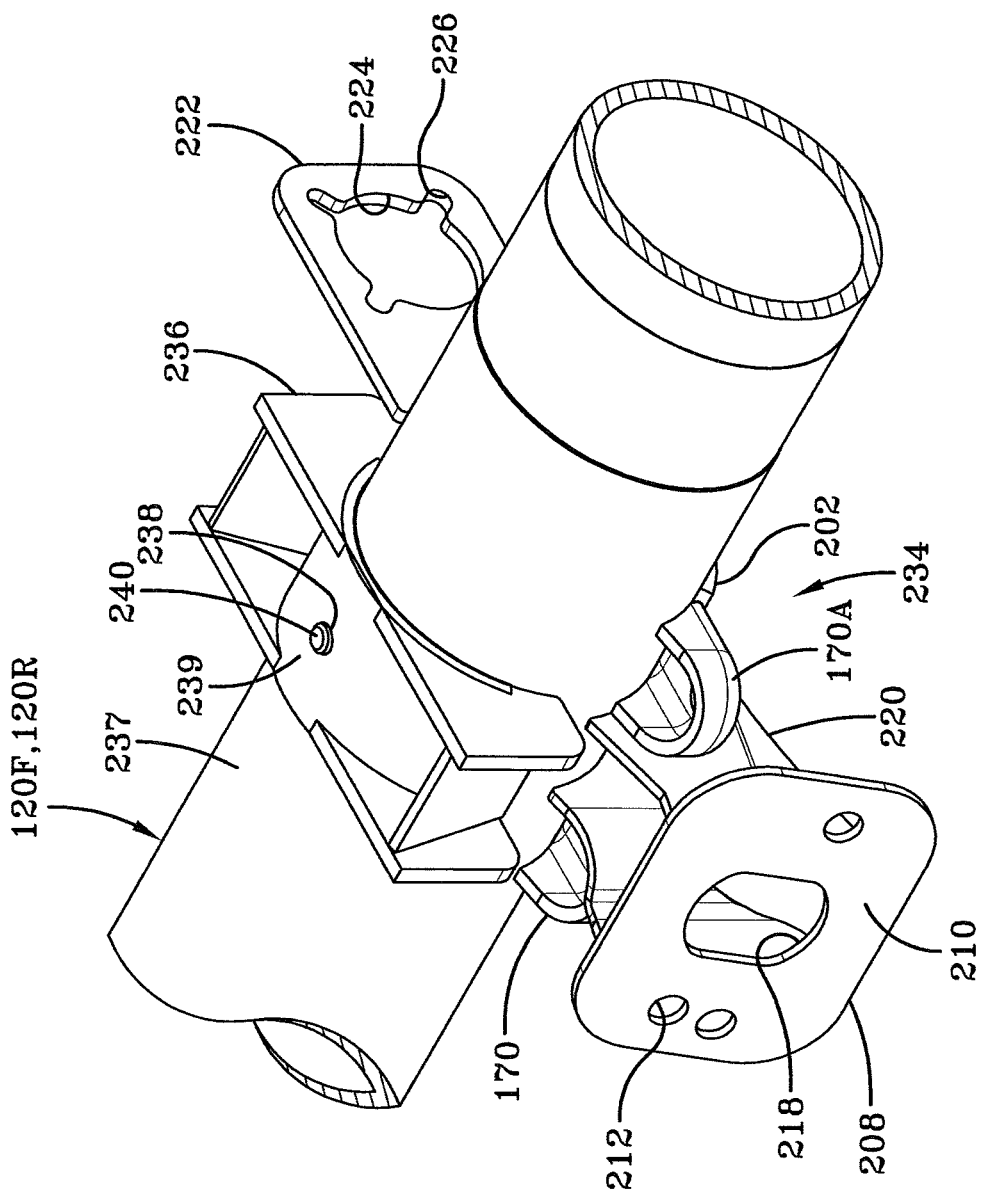
FIG. 10 is a fragmentary driver's side top-front perspective view of the axle portion, top axle seat, and integrated brake component mounting bracket shown in FIG. 9, with a top plate of the top axle seat removed.
Figure 11:
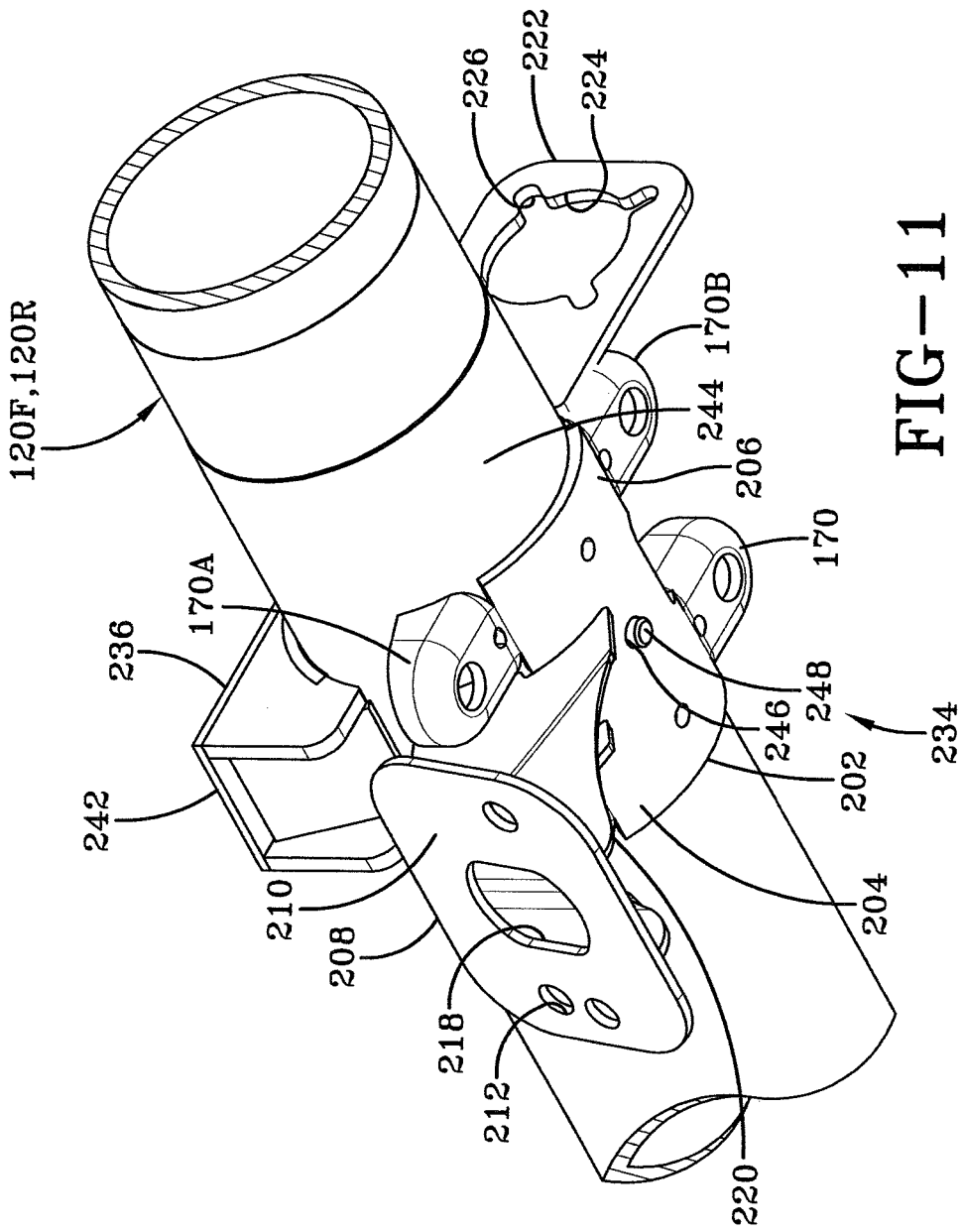
FIG. 11 is a fragmentary driver's side bottom-front perspective view of the axle portion, top axle seat, and integrated brake component mounting bracket shown in FIG. 9.

Turning now to FIGS. 9-11, a second exemplary embodiment of an integrated brake component mounting bracket for a spring axle/suspension system of the present invention is indicated generally at 234. Second embodiment integrated brake component mounting bracket 234 is generally similar in structure and operation to first embodiment integrated brake component mounting bracket 200 (FIGS. 5-8), with the exception that the second embodiment integrated brake component mounting bracket employs a structure that reduces or eliminates welding of the integrated brake component mounting bracket and top axle seat 160 to axle 120F, 120R. As a result, only the differences between second embodiment integrated brake component mounting bracket 234 and first embodiment integrated brake component mounting bracket 200 will be described below.

As described above, bottom axle seat 202 of axle integrated brake component mounting bracket 200 and top axle seat 160 preferably are welded to each respective axle 120F, 120R. In certain applications, it may be desirable to reduce or eliminate such welding, which enables axle 120F, 120R to be formed with an even thinner wall when employing second embodiment integrated brake component mounting bracket 234 when compared to first embodiment integrated brake component mounting bracket 200. To reduce or eliminate such welding, second embodiment integrated brake component mounting bracket 234 and a top axle seat 236 utilize mechanical attachment to each respective axle 120F, 120R.

More particularly, with reference to FIGS. 9-10, each respective axle 120F, 120R is formed with an opening (not shown) in an upper or top area 237 of the axle beneath top axle seat 236. A corresponding opening 238 is formed in a curved axle mounting plate 239 of top axle seat 236, which is the portion of the top axle seat that contacts the axle. A dowel 240 extends through the opening in upper axle area 237 and through aligned opening 238 formed in curved axle mounting plate 239. Preferably, dowel 240 is secured to axle 120F, 120R and to curved axle mounting plate 239 by welding. An aligned opening 241 may be formed in an upper plate 242 of the top axle seat 236 in order to provide access to the opening in upper axle area 237, opening 238 in curved axle mounting plate 239, and/or dowel 240. The positive mechanical engagement of dowel 240 in the opening in upper axle area 237 and opening 238 in curved axle mounting plate 239 secures the position of top axle seat 236 on axle 120F, 120R, respectively.

Turning to FIG. 11, similar to first embodiment integrated brake component mounting bracket 200, second embodiment integrated brake component mounting bracket 234 includes bottom axle seat 202, air chamber mounting bracket 208, and cam shaft assembly mounting bracket 222. However, each respective axle 120F, 120R is formed with an opening (not shown) in a lower or bottom area 244 of the axle, and bottom axle seat 202 of integrated brake component mounting bracket 234 is formed with a corresponding opening 246. A dowel 248 extends through the opening in lower axle area 244 and aligned opening 246 formed in bottom axle seat 202. Preferably, dowel 248 is secured to axle 120F, 120R and to bottom axle seat 202 by welding. The positive mechanical engagement of dowel 248 in the opening in lower axle area 244 and opening 246 in bottom axle seat 202 secures the position of integrated brake component mounting bracket 234 on axle 120F, 120R, respectively.

In this manner, dowels 240, 248 provide positive mechanical engagement of top axle seat 236 and integrated brake component mounting bracket 234 with each axle 120F, 120R, respectively. This positive mechanical engagement combines with the clamp action of U-bolts 164 and nuts 174 (FIG. 6) to secure top axle seat 236 and integrated brake component mounting bracket 234 to each respective axle 120F, 120R, thereby eliminating the need to weld the top axle seat and bottom axle seat 202 of the integrated brake component mounting bracket to each axle. Elimination of such welding enables axle 120F, 120R to be formed with a thinner wall when employing second embodiment integrated brake component mounting bracket 234, as compared to first embodiment integrated brake component mounting bracket 200.

Such reduction of the wall thickness of each axle 120F, 120R in turn desirably reduces the cost associated with manufacturing an axle/suspension system using second embodiment integrated brake component mounting bracket 234, as the amount of material used to manufacture each axle is reduced. Moreover, the reduction of the wall thickness of each axle 120F, 120R desirably reduces the cost to operate a vehicle that employs an axle/suspension system with second embodiment integrated brake component mounting bracket 234, as axle weight is reduced, which reduces vehicle fuel consumption and the resulting costs associated with operation of the vehicle.

In regard to the mechanical attachment of top axle seat 236 and second embodiment integrated brake component mounting bracket 234 to each respective axle 120F, 120R, it is to be understood that other means of mechanical engagement of the top axle seat and the integrated brake component mounting bracket to each axle may be used, without affecting the concept or operation of the invention. For example, dimpling of top axle seat 236, integrated brake component mounting bracket 234, axle 120F, 120R, and/or an associated axle sleeve, as described in application Ser. No. 13/249,420, which is assigned to the same assignee as the present invention, Hendrickson USA, L.L.C., may be employed.

Figure 12:
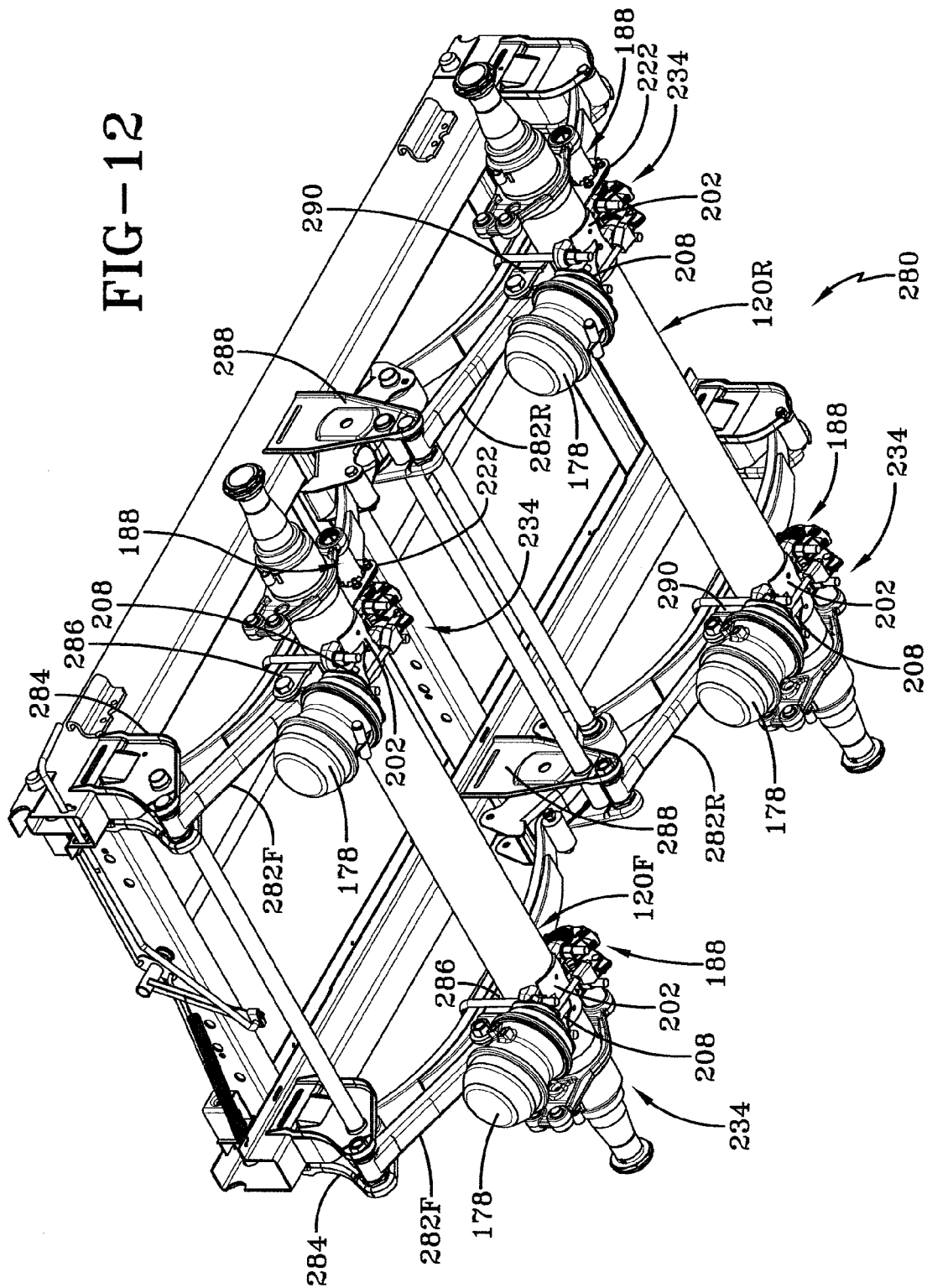
FIG. 12 is a driver's side bottom-front perspective view of a trailer tandem mechanical spring axle/suspension system having radius rods and including the second exemplary embodiment of the integrated brake component mounting bracket of the present invention, shown mounted on a vehicle subframe and with brake system components mounted thereon.

It is to be understood that integrated brake component mounting bracket of the present invention 200, 234, may be employed in conjunction with types of spring axle/suspension systems other than those shown and described herein, without affecting the overall concept or operation of the invention. For example, with reference to FIG. 12 and using second embodiment integrated brake component mounting bracket 234 by way of example, the integrated brake component mounting bracket is shown incorporated into a spring axle/suspension system 280 that includes radius rods 282F, 282R. More particularly, certain types of spring axle/suspension systems include radius rods 282F, 282R to maintain axle alignment and to react brake forces and other fore-aft forces. For example, in order to control fore-aft movement of front axle 120F, a front radius rod 282F may be pivotally connected to and extend between a front hanger 284 and a front top axle seat 286. Likewise, to control fore-aft movement of rear axle 120R, a rear radius rod 282R may be pivotally connected to and extend between a center hanger 288 and rear top axle seat 290.

The structure and operation of integrated brake component mounting bracket 234 as incorporated into spring axle/suspension system 280 with radius rods 282F, 282R is the same as described above, as the bracket includes bottom axle seat 202, air chamber mounting bracket 208, and cam shaft assembly mounting bracket 222. Bottom axle seat 202 is disposed on a lower portion of each respective axle 120F, 120R in vertical alignment with each respective top axle seat 286, 290, and is connected to each axle in the same manner that is described above. Integrated brake component mounting bracket 234 thus provides a structure that enables brake chamber 178 and cam shaft assembly 188 to be rigidly mounted on or adjacent each axle 120F, 120R of spring axle/suspension system 280 without welding a brake chamber bracket and/or a cam shaft assembly mounting bracket to the vehicle axle. Reduction or elimination of such welding reduces the susceptibility of axle 120F, 120R to possible damage, and enables the axle to be formed with a thinner wall, thereby desirably reducing the weight and cost associated with the axle.

Turning now to FIGS. 13-17, a third exemplary embodiment of an integrated brake component mounting bracket for a spring axle/suspension system of the present invention is indicated generally at 300. More particularly, while first and second embodiments integrated brake component mounting bracket of the present invention 200, 234, respectfully, are shown and/or described in use on overslung spring axle/suspension systems 100 (e.g., FIG. 5), in which springs 124, 140 are disposed above or over each respective axle 120F, 120R, the invention also applies to underslung axle/suspension systems, in which the springs are disposed below or under each respective axle, without affecting its overall concept or operation.

Figure 13:
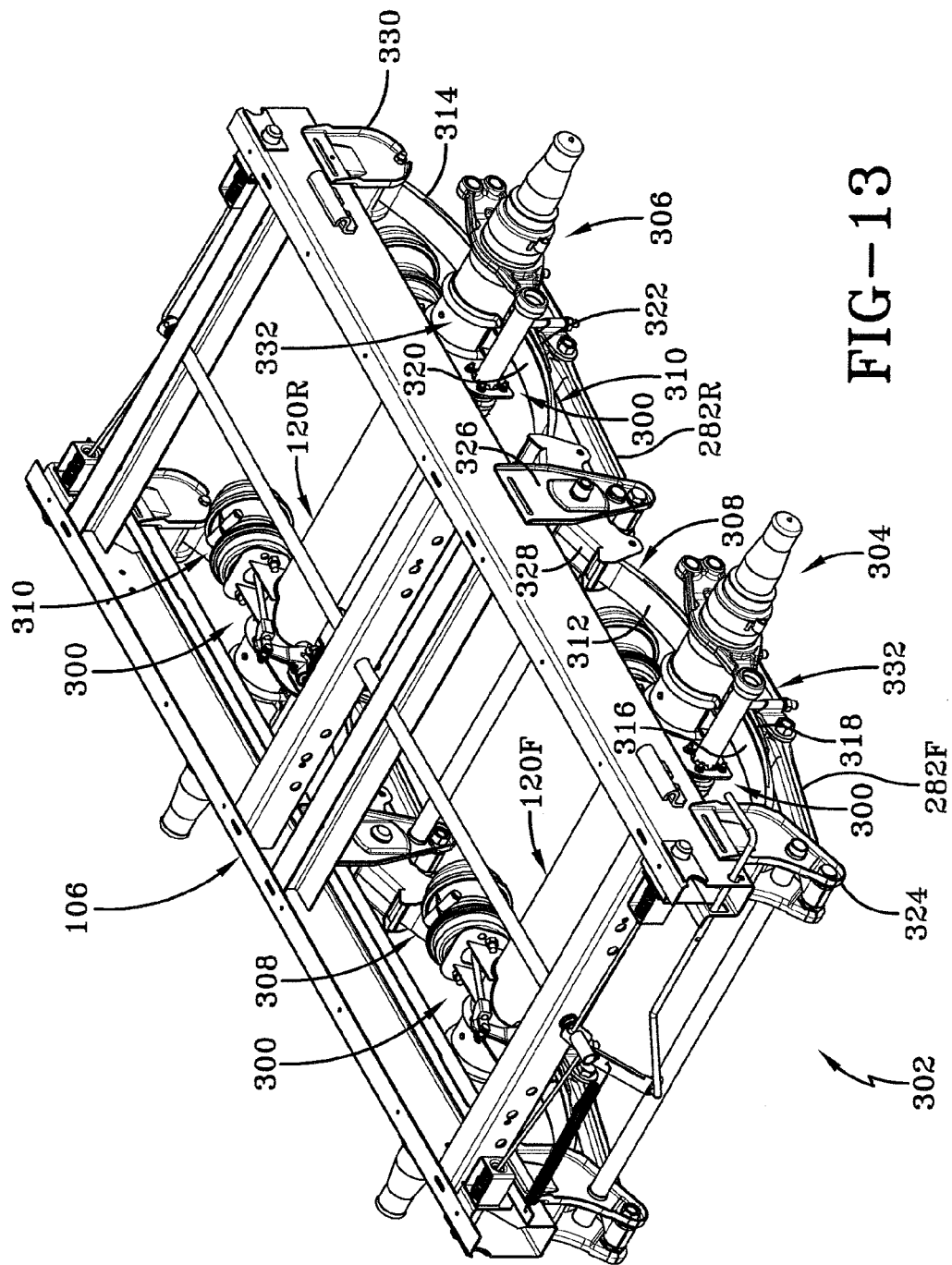
FIG. 13 is a driver's side top-front perspective view of an underslung trailer tandem mechanical spring axle/suspension system including a third exemplary embodiment of the integrated brake component mounting bracket of the present invention, shown mounted on a vehicle subframe and with certain brake system components mounted thereon.
Figure 14:
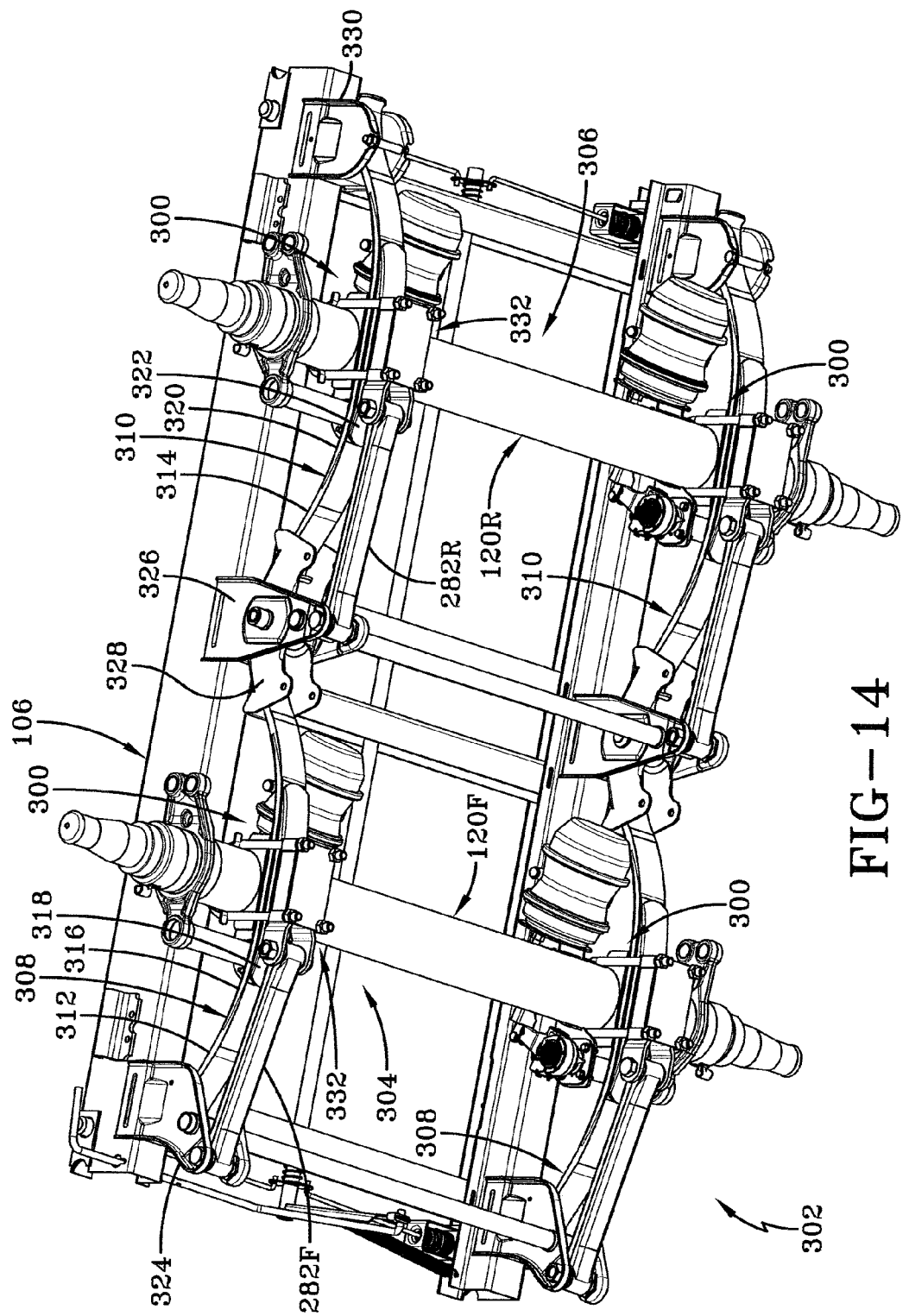
FIG. 14 is a driver's side bottom-front perspective view of the underslung trailer tandem mechanical spring axle/suspension assembly, including the integrated brake component mounting bracket, shown in FIG. 13.

With particular reference to FIGS. 13 and 14, an exemplary underslung axle/suspension system is indicated at 302, and is a tandem system, utilizing a front axle/suspension system 304 and a rear axle/suspension system 306, each of which is connected to and depends from a vehicle subframe 106. Front axle/suspension system 304 includes a pair of transversely-spaced, longitudinally-extending mechanical spring suspension assemblies 308, which connect to front axle 120F. Similarly, rear axle/suspension system 306 includes a pair of transversely-spaced, longitudinally-extending mechanical spring suspension assemblies 310, which connect to rear axle 120R. Inasmuch as each one of the pair of front mechanical spring suspension assemblies 308 is identical to the other, and each one of the pair of rear mechanical spring suspension assemblies 310 is identical to the other, only one of each will be described herein.

Front mechanical spring suspension assembly 308 includes a pair of transversely-spaced leaf spring sets or stacks 312, and rear mechanical spring suspension assembly 310 includes a pair of transversely-spaced leaf spring sets or stacks 314. Similar to axle/suspension system 100 described above (FIG. 5), front spring stack 312 preferably includes a top leaf spring 316 and a bottom leaf spring 318. Top leaf spring 316 extends longitudinally between a front hanger 324 and an equalizer or rocker 328. Rear spring stack 314 preferably includes a top leaf spring 320 and a bottom leaf spring 322, and extends longitudinally between equalizer 328 and a rear hanger 330. Exemplary underslung axle/suspension system also includes radius rods 282F, 282R. Front radius rod 282F preferably is pivotally connected to and extends between front hanger 324 and a clamp assembly 332, as will be described in greater detail below. Rear radius rod 282R preferably is pivotally connected to and extends between a center hanger 326 and clamp assembly 332, also as will be described in greater detail below.

Each spring stack 312, 314 is clamped to its respective axle 120F, 120R by clamp assembly 332. More particularly, and with reference now to FIGS. 15 and 16, clamp assembly 332 includes integrated brake component mounting bracket 300, a bottom axle seat 334, a bottom spring seat 336, and a pair of U-bolts 164. Bottom spring seat 336 is disposed on a lower surface of each bottom spring 318, 322 at about the longitudinal midpoint of each respective spring. Each bottom spring seat 336 is pivotally connected to a respective one of front and rear radius rods 282F, 282R, so that the front radius rod extends between and pivotally connects to the spring seat beneath front spring stack 312 to front hanger 324, and the rear radius rod extends between and pivotally connects to the spring seat beneath rear spring stack 314 and center hanger 326.

Bottom axle seat 334 is disposed between an upper surface of each top spring 316, 320 and a lower surface of each respective axle 120F, 120R in general vertical alignment with bottom spring seat 336. Preferably, each respective axle 120F, 120R is formed with an opening (not shown) in a lower or bottom area 340 of the axle above bottom axle seat 334. A corresponding opening (not shown) is formed in a curved axle mounting plate 338 of bottom axle seat 334, which is the portion of the bottom axle seat that contacts the axle. A dowel (not shown) extends through the opening in lower axle area 340 and through the aligned opening formed in curved axle mounting plate 338. Preferably, the dowel is secured to axle 120F, 120R and to curved axle mounting plate 338 by welding. The positive mechanical engagement of the dowel in the opening in lower axle area 340 and the opening in curved axle mounting plate 338 secures the position of bottom axle seat 334 on axle 120F, 120R, respectively. Alternatively, other means, such as welding or alternate mechanical means such as those described above, may be used to secure bottom axle seat 334 to each respective axle 120F, 120R.

Integrated brake component mounting bracket 300 is disposed on an upper portion 352 of each axle 120F, 120R in general vertical alignment with bottom spring seat 336 and bottom axle seat 334, and is connected to each respective axle in a manner that will be described in greater detail below. To secure clamp assembly 332, curved apex 166 of each U-bolt 164 engages and secures integrated brake component mounting bracket 300, while threaded end 168 of each U-bolt passes through an opening 342 formed in a respective boss 344, which in turn is formed on bottom spring seat 336. In this manner, integrated brake component mounting bracket 300, axle 120F, 120R, bottom axle seat 334, top leaf spring 316, 320, bottom leaf spring 318, 322, and bottom spring seat 336 are rigidly clamped and secured together when nuts 174 are tightened onto threaded U-bolt ends 168.

Figure 15:
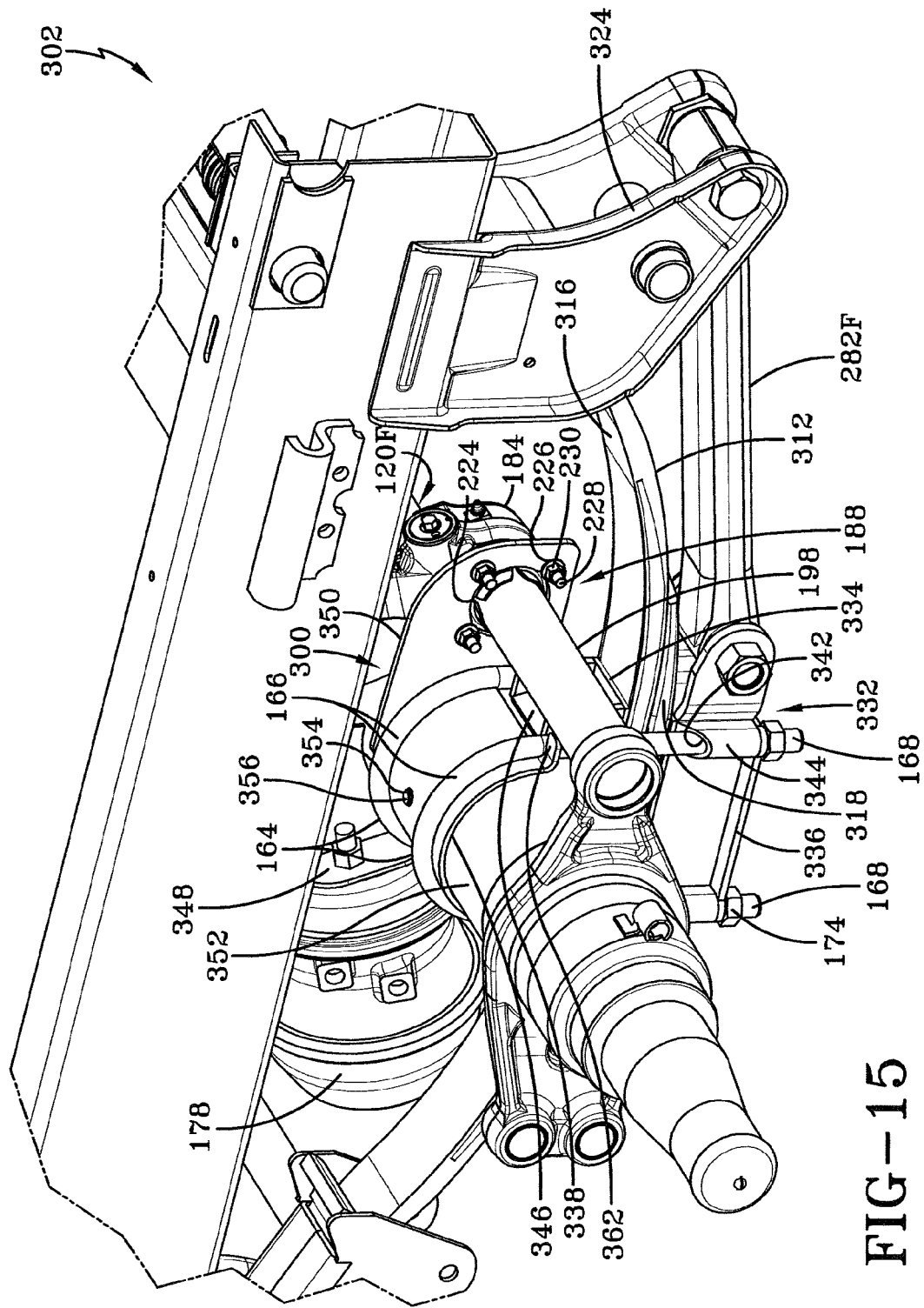
FIG. 15 is an enlarged fragmentary top front perspective view of a passenger-side front portion of the underslung trailer tandem mechanical spring axle/suspension assembly, including the integrated brake component mounting bracket, shown in FIG. 13.
Figure 16:
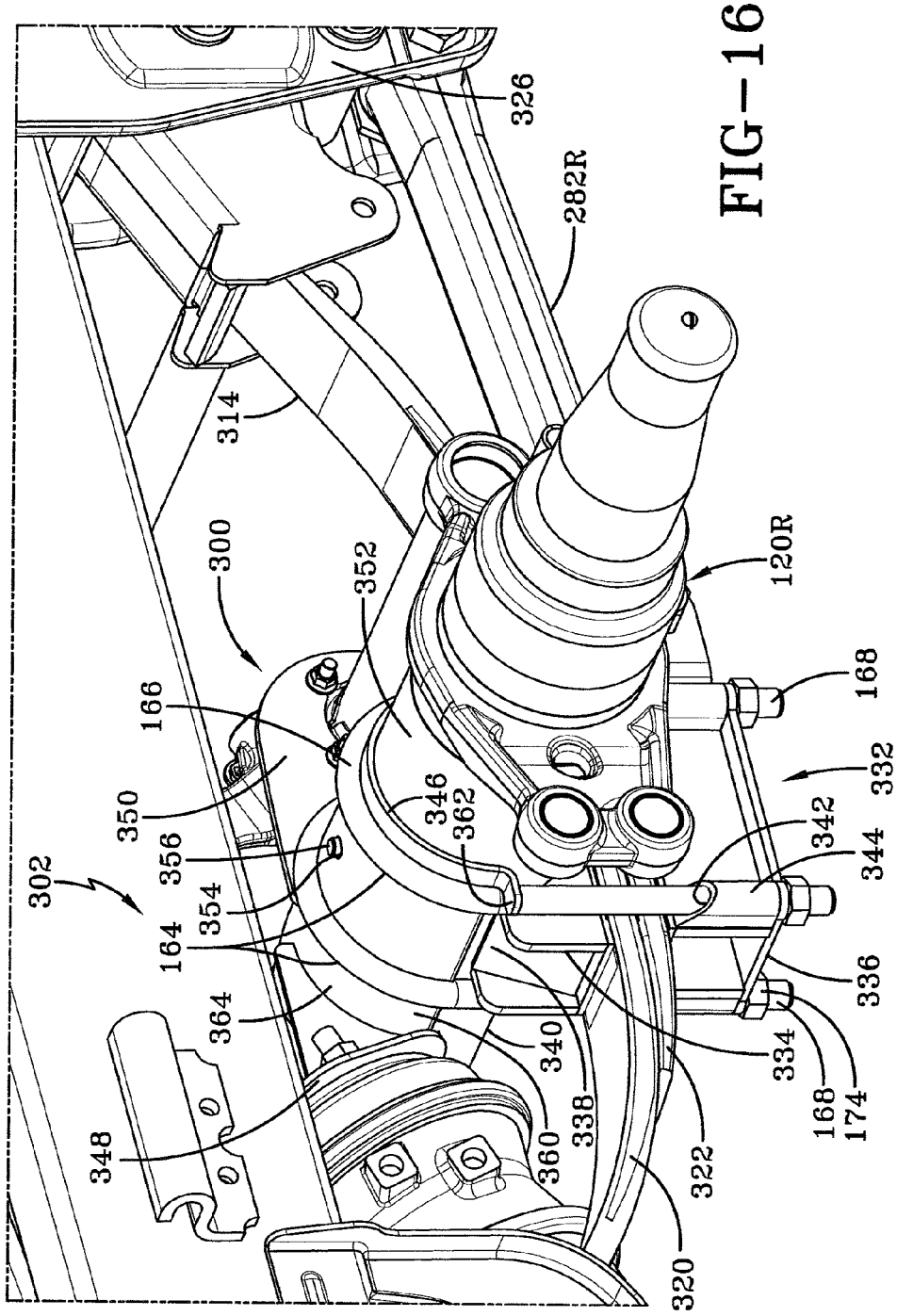
FIG. 16 is an enlarged fragmentary top rear perspective view of a passenger-side rear portion of the underslung trailer tandem mechanical spring axle/suspension assembly, including the integrated brake component mounting bracket, shown in FIG. 13.
Figure 17:
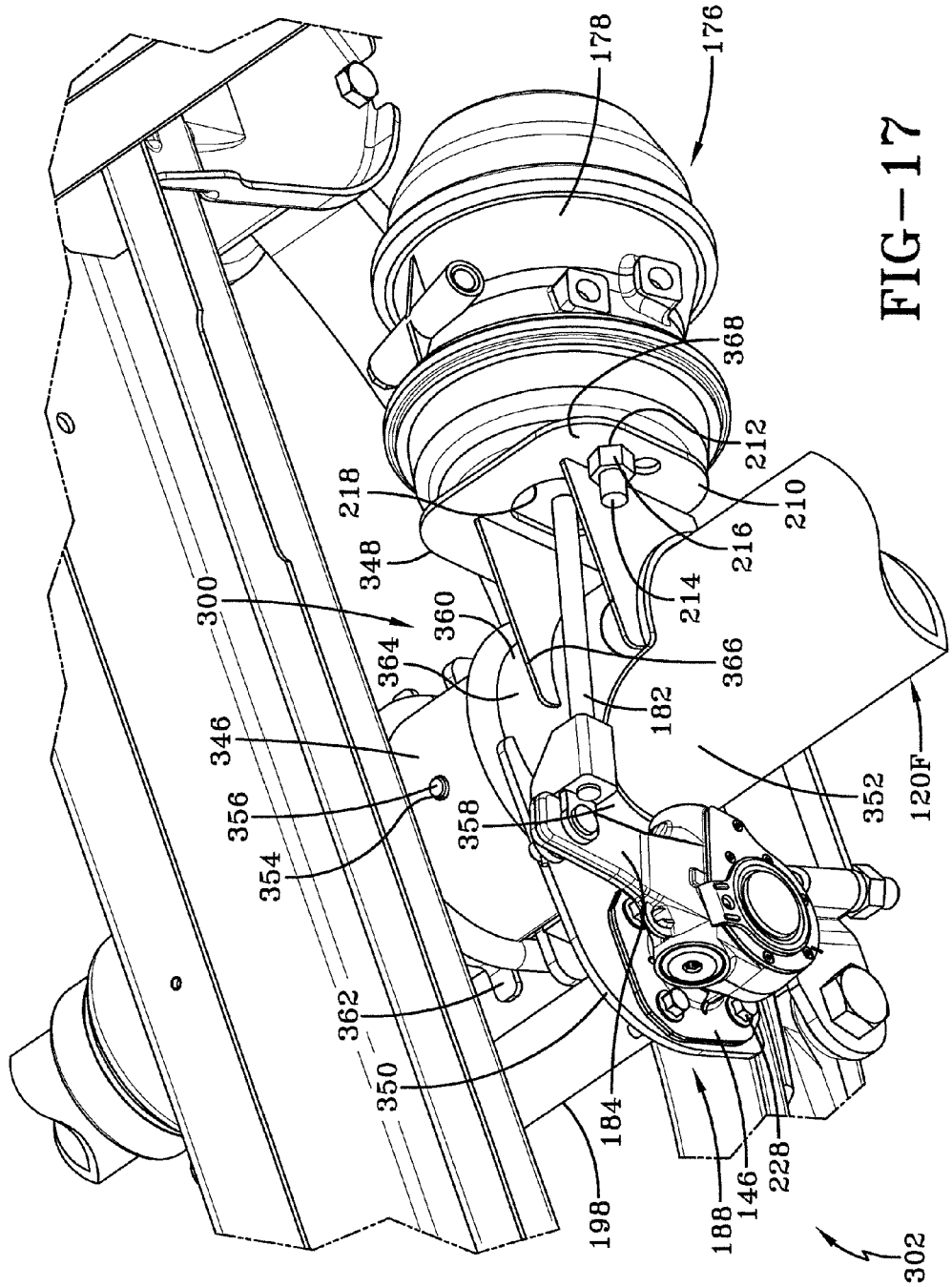
FIG. 17 is an enlarged fragmentary top perspective view, looking in the outboard direction, of a front passenger-side portion of the underslung trailer tandem mechanical spring axle/suspension assembly, including the integrated brake component mounting bracket, shown in FIG. 13.

With particular reference now to FIGS. 15-17, integrated brake component mounting bracket 300 includes a top axle seat 346, an air chamber mounting bracket 348, and a cam shaft assembly mounting bracket 350, which is also referred to as an S-cam bearing bracket. More particularly, top axle seat 346 is a curved plate that seats against upper portion 352 of each axle 120F, 120R. Each respective axle 120F, 120R is formed with an opening (not shown) in its upper or top area 352 of the axle, and top axle seat 346 of integrated brake component mounting bracket 300 is formed with a corresponding opening 354. A dowel 356 extends through the opening in upper axle area 352 and aligned opening 354 formed in top axle seat 346. Preferably, dowel 356 is secured to axle 120F, 120R and to top axle seat 346 by welding. The positive mechanical engagement of dowel 356 in the opening in upper axle area 352 and opening 354 in top axle seat 346 secures the position of integrated brake component mounting bracket 300 on axle 120F, 120R, respectively. Alternatively, other means, such as welding or alternate mechanical means such as those described above, may be used to secure top axle seat 346 to each respective axle 120F, 120R.

Top axle seat 346 includes mechanical features such as tabs 362, which are integrally formed on the seat to retain the alignment of U-bolts 164. Due to space constraints imposed by underslung axle/suspension system 302, top axle seat 346 extends inboardly along upper axle area 352, forming an inboard extension 364. Inboard extension 364 includes a front portion 358 and a rear portion 360, and air chamber mounting bracket 348 is rigidly attached to the rear portion of the inboard extension.

More particularly, as best shown in FIG. 17, air chamber mounting bracket 348 is similar to air chamber mounting bracket 208 of first embodiment integrated brake component mounting bracket 200 (FIG. 6), and thus includes mounting plate 210 that is disposed generally parallel to each respective transversely-extending axle 120F, 120R. Mounting plate 210 is formed with openings 212 to accept bolts 214 of brake chamber 178, which are secured to the mounting plate with nuts 216. A central opening 218 is also formed in mounting plate 210 to enable brake chamber pushrod 182 to extend through air chamber mounting bracket 348 and connect to slack adjuster 184. Inboardly and outboardly of central opening 218, connecting plates 366 are rigidly attached to a front surface 368 of mounting plate 210, preferably by welding or integral forming, and extend perpendicular to axle 120F, 120R to rear portion 360 of inboard extension 364. Connecting plates 366 are rigidly attached, preferably by welding or integral forming, to rear portion 360 of inboard extension 364. Such rigid attachment of mounting plate 210 to inboard extension 364 of top axle seat 346 immediately inboard and adjacent each respective spring stack 312, 314 provides desired stability of brake chamber 178.

With reference now to FIGS. 15 and 17, cam shaft assembly mounting bracket 350 of integrated brake component mounting bracket 300 extends perpendicular to axle 120F, 120R and is rigidly attached to front portion 358 of inboard extension 364, preferably by welding or integral forming, inboardly of an inboard one of U-bolts 164. Cam shaft assembly mounting bracket 350 is similar to cam shaft assembly mounting bracket 222 of first embodiment integrated brake component mounting bracket 200 (FIG. 6), and thus is formed with opening 224 to enable a cam tube 198 of cam shaft assembly 188 to extend through the mounting bracket. Cam shaft assembly mounting bracket 350 is also formed with a plurality of slots 226 adjacent opening 224 to accept fasteners, such as bolts 228, which are secured with nuts 230, to enable the mounting of cam tube bracket 146 on the cam shaft assembly mounting bracket. In this manner, cam shaft assembly mounting bracket 350 enables the rigid attachment of cam shaft assembly 188 to inboard extension 364 of top axle seat 346, thereby providing desired stability of the cam shaft assembly.

The operation of components of brake system 176 installed on third embodiment integrated brake component mounting bracket 300 is similar to the operation described above for first embodiment integrated brake component mounting bracket 200 (FIG. 7). As a result of the structural integration of cam shaft assembly mounting bracket 350 to front portion 358 of inboard extension 364 of top axle seat 346, integrated brake component mounting bracket 300 provides rigid attachment of cam shaft assembly 188 to the top axle seat immediately inboard and adjacent each respective spring stack 312, 314, thereby providing desired stability and positioning of the cam shaft assembly. Likewise, as a result of the structural integration of air chamber mounting bracket 348 to rear portion 360 of inboard extension 364 of top axle seat 346, integrated brake component mounting bracket 300 provides rigid attachment of brake chamber 178 to the top axle seat immediately inboard and adjacent each respective spring stack 312, 314, thereby providing desired stability and positioning of the brake chamber.

In this manner, integrated brake component mounting bracket 300 provides a structure that enables brake chamber 178 and cam shaft assembly 188 to be rigidly mounted on or adjacent each axle 120F, 120R, without welding a brake chamber bracket and/or a cam shaft assembly mounting bracket to the vehicle axle. By eliminating the welding of brackets to each axle 120F, 120R, integrated brake component mounting bracket 300 enables each axle to be less susceptible to possible damage, as described above. In addition, because integrated brake component mounting bracket 300 enables elimination of the welding of a brake chamber bracket and/or a cam shaft assembly mounting bracket to each axle 120F, 120R, each axle can be formed with a thinner wall, also as described above. Such reduction of the wall thickness of each axle 120F, 120R in turn desirably reduces the cost associated with manufacturing underslung axle/suspension system 302 employing integrated brake component mounting bracket 300, as the amount of material used to manufacture each axle is reduced. Moreover, the reduction of the wall thickness of each axle 120F, 120R desirably reduces the cost to operate a vehicle that employs underslung axle/suspension system 302 with integrated brake component mounting bracket 300, as axle weight is reduced, which in turn reduces vehicle fuel consumption and the resulting costs associated with operation of the vehicle.

Moreover, when the preferred configuration employing dowels 356 to provide positive mechanical engagement of bottom axle seat 334 and integrated brake component mounting bracket 300 with each respective axle 120F, 120R, welding of components to each axle is further reduced. More particularly, this positive mechanical engagement combines with the clamp action of U-bolts 164 and nuts 174 to secure bottom axle seat 334 and integrated brake component mounting bracket 300 to each respective axle 120F, 120R, thereby eliminating the need to weld the bottom axle seat and top axle seat 346 to each axle. Elimination of such welding enables axle 120F, 120R to be formed with a thinner wall when employing third embodiment integrated brake component mounting bracket 300, as compared to first embodiment integrated brake component mounting bracket 200.

Such reduction of the wall thickness of each axle 120F, 120R in turn desirably reduces the cost associated with manufacturing an axle/suspension system using third embodiment integrated brake component mounting bracket 300, as the amount of material used to manufacture each axle is reduced. Moreover, the reduction of the wall thickness of each axle 120F, 120R desirably reduces the cost to operate a vehicle that employs an axle/suspension system with third embodiment integrated brake component mounting bracket 300, as axle weight is reduced, which reduces vehicle fuel consumption and the resulting costs associated with operation of the vehicle.

In this manner, integrated brake component mounting bracket of the present invention 200, 234, 300 provides a structure that enables brake chamber 178 and cam shaft assembly 188 to be rigidly mounted on or adjacent each axle 120F, 120R, without welding a brake chamber bracket and/or a cam shaft assembly mounting bracket to the vehicle axle. By eliminating the welding of such brackets to each axle 120F, 120R, integrated brake component mounting bracket of the present invention 200, 234, 300 enables each axle to be less susceptible to possible damage.

In addition, elimination of the welding of a brake chamber bracket and/or a cam shaft assembly mounting bracket to each axle 120F, 120R by integrated brake component mounting bracket 200, 234, 300 enables each axle to be formed with a thinner wall. Such reduction of the wall thickness of each axle 120F, 120R in turn desirably reduces the cost associated with manufacturing an axle/suspension system using integrated brake component mounting bracket 200, 234, 300 as the amount of material used to manufacture each axle is reduced. Moreover, the reduction of the wall thickness of each axle 120F, 120R desirably reduces the cost to operate a vehicle that employs an axle/suspension system with integrated brake component mounting bracket 200, 234, 300 as axle weight is reduced, which reduces vehicle fuel consumption and the resulting costs associated with operation of the vehicle.

Second and third embodiments integrated brake component mounting bracket 234, 300 employ mechanical attachment of top axle seat 236, 346 and bottom axle seat 202, 334 to each respective axle 120F, 120, thereby reducing or eliminating the need to weld the top axle seat and the bottom axle seat to each axle. Reduction or elimination of such welding enables axle 120F, 120R to be formed with a thinner wall when employing second or third embodiment integrated brake component mounting bracket 234, 300 as compared to first embodiment integrated brake component mounting bracket 200, further reducing axle cost and weight.

First and second embodiments integrated brake component mounting bracket of the present invention 200, 234 enable the rigid attachment of air chamber mounting bracket 208 and cam shaft assembly mounting bracket 222 in alignment with bottom axle seat 202, rather than being offset from the bottom axle seat. This structural alignment provides stability of air chamber mounting bracket 208 and cam shaft assembly mounting bracket 222, which in turn enables brake chamber 178 and cam shaft assembly 188 to be rigidly mounted on or adjacent each axle 120F, 120R in a stable manner.

Third embodiment integrated brake component mounting bracket 300 enables the rigid attachment of air chamber mounting bracket 348 and cam shaft assembly mounting bracket 350 immediately adjacent each respective spring stack 312, 314 on an underslung axle/suspension system 302. This structural positioning provides stability of air chamber mounting bracket 348 and cam shaft assembly mounting bracket 350, which in turn enables brake chamber 178 and cam shaft assembly 188 to be rigidly mounted on or adjacent each axle 120F, 120R in a stable manner within the space constraints imposed by underslung axle/suspension system 302.

The present invention also includes a method of mounting a brake chamber and a cam shaft assembly to an integrated brake component mounting bracket, including steps in accordance with the description that is presented above and shown in FIGS. 5-17.

It is to be understood that the structure of the above-described integrated brake component mounting bracket of the present invention 200, 234, 300, may be altered or rearranged, or certain components omitted or added, without affecting the overall concept or operation of the invention. As described above, it is also to be understood that the above-described integrated brake component mounting bracket of the present invention 200, 234, 300, may be employed in conjunction with any type of spring axle/suspension system without affecting the overall concept or operation of the invention. For example, the invention applies to overslung and to underslung configurations of axle/suspension systems. In addition, the invention applies to various types of frames used for heavy-duty vehicles, including primary frames that do not support a subframe and primary frames and/or floor structures that do support a movable or non-movable subframe.

Accordingly, the improved integrated brake component mounting bracket is simplified, provides an effective, safe, inexpensive, and efficient structure which achieves all the enumerated objectives, provides for eliminating difficulties encountered with prior art brake component mounting brackets, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved integrated brake component mounting bracket is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A brake component mounting bracket for at least one leaf spring of a mechanical spring axle/suspension system of a heavy-duty vehicle, said brake component mounting bracket comprising:
    an axle seat rigidly connected to an axle of said vehicle;
    an air chamber mounting bracket rigidly connected to said axle seat; and
    a cam shaft assembly mounting bracket rigidly connected to said axle seat, a brake air chamber of a brake system being rigidly attached to said air chamber mounting bracket, and a cam shaft assembly of said brake system being rigidly mounted to said cam shaft assembly mounting bracket, whereby said air chamber mounting bracket, said cam shaft assembly mounting bracket and said axle seat are beneath and substantially vertically aligned with said at least one leaf spring of said mechanical spring axle/suspension system.

2. The brake component mounting bracket of claim 1, wherein said axle seat is a bottom axle seat that seats against a lower portion of said axle, and which includes a front portion and a rear portion.

3. The brake component mounting bracket of claim 2, wherein said air chamber mounting bracket includes:

a mounting plate disposed generally parallel to said axle, said mounting plate being formed with openings to enable said brake air chamber to be mounted on the mounting plate; and a connecting plate rigidly attached to and extending between a rear surface of said mounting plate and said front portion of said bottom axle seat, said connecting plate providing rigid attachment of the mounting plate in alignment with the bottom axle seat.

4. The brake component mounting bracket of claim 2, wherein said cam shaft assembly mounting bracket extends perpendicular to and is rigidly attached to said rear portion of said bottom axle seat, said cam shaft assembly mounting bracket being formed with openings to enable the said cam shaft assembly to be mounted on the cam shaft assembly mounting bracket.

5. The brake component mounting bracket of claim 2, wherein said bottom axle seat is welded to said axle.

6. The brake component mounting bracket of claim 2, wherein said axle is formed with an opening in a lower area, said bottom axle seat is formed with an opening corresponding to said axle opening, and a dowel engages said axle opening and said bottom axle seat opening to secure the bottom axle seat to the axle.

7. The brake component mounting bracket of claim 2, wherein said brake component mounting bracket is incorporated into a clamp assembly that secures said at least one leaf spring of said mechanical spring axle/suspension system to said axle, and wherein said clamp assembly includes:
an upper plate disposed on an upper surface of said at least one leaf spring;
a top axle seat disposed between a lower surface of said at least one leaf spring and an upper portion of said axle in general vertical alignment with said upper plate;
at least one U-bolt; and
said brake component mounting bracket being formed with bosses that include openings for receiving respective ends of said at least one U-bolt, the brake component mounting bracket being disposed on a lower portion of said axle in general vertical alignment with said upper plate and said top axle seat, whereby the at least one U-bolt secures together said upper plate, said at least one leaf spring, said top axle seat, said axle, and said brake component mounting bracket.

8. The brake component mounting bracket of claim 7, wherein said bottom axle seat of said brake component mounting bracket and said top axle seat are welded to said axle.

9. The brake component mounting bracket of claim 7, wherein:
said axle is formed with an opening in an upper area;
said top axle seat is formed with an opening corresponding to said axle upper opening;
a first dowel engages said top axle seat opening and said axle upper opening to secure said top axle seat to said axle;
said axle is formed with an opening in a lower area;
said bottom axle seat of said brake component mounting bracket is formed with an opening corresponding to said axle lower opening; and
a second dowel engages said bottom axle seat opening and said axle lower opening to secure said bottom axle seat to said axle.

10. The brake component mounting bracket of claim 7, wherein said top axle seat is secured to said axle by dimpling of the top axle seat, and said bottom axle seat of said brake component mounting bracket is secured to said axle by dimpling of the brake component mounting bracket.

11. The brake component mounting bracket of claim 7, wherein said top axle seat is operatively connected to a radius rod of said mechanical spring axle/suspension system.

12. The brake component mounting bracket of claim 1, wherein said axle includes an outer diameter of about 5.75 inches and a wall thickness of about 0.312 inches.

13. The brake component mounting bracket of claim 1, wherein said brake component mounting bracket is free of welding of said brake chamber bracket and said cam shaft assembly mounting bracket to said axle.

14. The brake component mounting bracket of claim 1, wherein said at least one leaf spring is disposed above said axle.

15. A clamp assembly for a mechanical spring axle/suspension system, said clamp assembly securing at least one leaf spring of said mechanical spring axle/suspension system to an axle of the mechanical spring axle/suspension system, said clamp assembly comprising:
a brake component mounting bracket including:
an axle seat rigidly connected to an axle of said vehicle;
an air chamber mounting bracket rigidly connected to said axle seat; and
a cam shaft assembly mounting bracket rigidly connected to said axle seat, a brake air chamber of a brake system being rigidly attached to said air chamber mounting bracket, and a cam shaft assembly of said brake system being rigidly mounted to said cam shaft assembly mounting bracket, whereby said air chamber mounting bracket, said cam shaft assembly mounting bracket and said axle seat are beneath and substantially vertically aligned with said at least one leaf spring of said mechanical spring axle/suspension system; and
at least one U-bolt for securing together said at least one leaf spring, said axle, and said brake component mounting bracket.

16. A clamp assembly of a mechanical spring axle/suspension system of a heavy-duty vehicle, said clamp assembly securing at least one leaf spring of said mechanical spring axle/suspension system to an axle of the mechanical spring axle/suspension system, said clamp assembly comprising:
an upper plate disposed on an upper surface of said at least one leaf spring;
a top axle seat disposed between a lower surface of said at least one leaf spring and an upper portion of said axle in general vertical alignment with said upper plate;
at least one U-bolt;
a brake component mounting bracket, said brake component mounting bracket being formed with bosses that include openings for receiving respective ends of said at least one U-bolt, and including:
a bottom axle seat, said bottom axle seat seating against and being rigidly connected to a lower portion of an axle of said vehicle, and including a front portion and a rear portion;
an air chamber mounting bracket rigidly connected to said axle seat; and
a cam shaft assembly mounting bracket rigidly connected to said axle seat, whereby a brake air chamber of a brake system is rigidly attached to said air chamber mounting bracket, and a cam shaft assembly of said brake system is rigidly mounted to said cam shaft assembly mounting bracket; and
said brake component mounting bracket being disposed on a lower portion of said axle in general vertical alignment with said upper plate and said top axle seat, whereby the at least one U-bolt secures together said upper plate, said at least one leaf spring, said top axle seat, said axle, and said brake component mounting bracket.

17. The clamp assembly of claim 16, wherein:
said axle is formed with an opening in an upper area;
said top axle seat is formed with an opening corresponding to said axle upper opening;
a first dowel engages said top axle seat opening and said axle upper opening to secure said top axle seat to said axle;
said axle is formed with an opening in a lower area;
said bottom axle seat of said brake component mounting bracket is formed with an opening corresponding to said axle lower opening; and
a second dowel engages said bottom axle seat opening and said axle lower opening to secure said bottom axle seat to said axle.

18. The clamp assembly of claim 16, wherein said top axle seat is secured to said axle by dimpling of the top axle seat, and said bottom axle seat of said brake component mounting bracket is secured to said axle by dimpling of the brake component mounting bracket.

19. The clamp assembly of claim 16, wherein said top axle seat is operatively connected to a radius rod of said mechanical spring axle/suspension system.

\* \* \* \* \*